(12) United States Patent
Cunningham et al.

(10) Patent No.: US 7,202,851 B2
(45) Date of Patent: Apr. 10, 2007

(54) HAPTIC INTERFACE FOR PALPATION SIMULATION

(75) Inventors: Richard L. Cunningham, Washington, DC (US); Robert F. Cohen, Burtonsville, MD (US); Russell H. Dumas, Germantown, MD (US); Gregory L. Merril, Chevy Chase, MD (US); Philip G. Feldman, Catonsville, MD (US); Joseph L. Tasto, Brookeville, MD (US)

(73) Assignee: Immersion Medical Inc., Gaithersburg, MD (US)

( * ) Notice: Subject to any disclaimer, the term of this patent is extended or adjusted under 35 U.S.C. 154(b) by 294 days.

(21) Appl. No.: 09/848,966

(22) Filed: May 4, 2001

(65) Prior Publication Data

US 2002/0163497 A1    Nov. 7, 2002

(51) Int. Cl.
*G09G 5/00* (2006.01)
(52) U.S. Cl. .................................... 345/156; 345/163
(58) Field of Classification Search ............... 345/156, 345/158, 157–176, 160, 173, 161, 123, 124, 345/163, 184, 420, 433, 700, 701, 702, 164, 345/165, 178; 341/27; 178/18.01, 18.02, 178/18.03, 18.09; 318/561; 434/262, 267, 434/268–275
See application file for complete search history.

(56) References Cited

U.S. PATENT DOCUMENTS

| | | | |
|---|---|---|---|
| 2,832,073 A | 11/1958 | Arkus et al. |
| 2,972,140 A | 2/1961 | Hirsch |
| 3,157,853 A | 11/1964 | Hirsch |
| 3,220,121 A | 11/1965 | Cutler |
| 3,226,846 A | 1/1966 | Wood |
| 3,497,668 A | 2/1970 | Hirsch |
| 3,517,446 A | 6/1970 | Corlyon et al. |
| 3,520,060 A | 7/1970 | Crabtree et al. |
| 3,623,064 A | 11/1971 | Kagan |
| 3,662,076 A | 5/1972 | Gordon et al. |
| 3,775,865 A | 12/1973 | Rowan |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |

(Continued)

FOREIGN PATENT DOCUMENTS

EP    0 265 011 B1    10/1987

(Continued)

OTHER PUBLICATIONS

Virtual Reality Training Simulation for Palpation of Subsurface Tumors.*

(Continued)

*Primary Examiner*—Nitin Patel
(74) *Attorney, Agent, or Firm*—Thelen Reid Brown Raysman and Steiner LLP; David B. Ritchie

(57) ABSTRACT

A palpation simulator comprises an interface for interfacing a user with a computer running a palpation simulation. The computer generates a graphical environment comprising a cursor and a graphical representation of at least a portion of a living body. In one version, a method comprises providing an object in communication with the computer, controlling the cursor in relation to manipulation of at least a portion of the object by the user, and outputting a haptic sensation to the user when the cursor interacts with a region within the graphical representation to provide the user with haptic feedback related to a simulated palpation of the region.

44 Claims, 16 Drawing Sheets

U.S. PATENT DOCUMENTS

| | | |
|---|---|---|
| 3,994,282 A | 11/1976 | Moulet |
| 4,052,981 A | 10/1977 | Bachmann |
| 4,127,752 A | 11/1978 | Lowthorp |
| 4,160,508 A | 7/1979 | Salisbury, Jr. |
| 4,236,325 A | 12/1980 | Hall et al. |
| 4,262,549 A | 4/1981 | Schwellenbach |
| 4,321,047 A | 3/1982 | Landis |
| 4,333,070 A | 6/1982 | Barnes |
| 4,360,345 A | 11/1982 | Hon |
| 4,391,282 A | 7/1983 | Ando et al. |
| 4,439,162 A | 3/1984 | Blaine |
| 4,459,113 A | 7/1984 | Boscaro Gatti et al. |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,638,798 A | 1/1987 | Sheldon et al. |
| 4,642,055 A | 2/1987 | Saliterman |
| 4,664,130 A | 5/1987 | Gracovetsky |
| 4,685,464 A | 8/1987 | Goldberger et al. |
| 4,708,656 A | 11/1987 | de Vries et al. |
| 4,713,007 A | 12/1987 | Alban |
| 4,726,772 A | 2/1988 | Amplatz |
| 4,750,487 A | 6/1988 | Zanetti |
| 4,773,865 A | 9/1988 | Baldwin |
| 4,787,051 A | 11/1988 | Olson |
| 4,789,340 A | 12/1988 | Zikria |
| 4,791,934 A | 12/1988 | Brunnett |
| 4,794,392 A | 12/1988 | Selinko |
| 4,795,296 A | 1/1989 | Jau |
| 4,825,872 A | 5/1989 | Tan et al. |
| 4,868,549 A | 9/1989 | Affinito et al. |
| 4,885,565 A | 12/1989 | Embach |
| 4,891,764 A | 1/1990 | McIntosh |
| 4,896,554 A | 1/1990 | Culver |
| 4,907,973 A | 3/1990 | Hon |
| 4,930,770 A | 6/1990 | Baker |
| 4,934,694 A | 6/1990 | McIntosh |
| 4,949,119 A | 8/1990 | Moncrief et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky et al. |
| 5,050,608 A | 9/1991 | Watanabe et al. |
| 5,078,152 A | 1/1992 | Bond et al. |
| 5,086,401 A | 2/1992 | Glassman et al. |
| 5,107,262 A | 4/1992 | Cadoz et al. |
| 5,112,228 A | 5/1992 | Zouras |
| 5,121,747 A | 6/1992 | Andrews |
| 5,131,844 A | 7/1992 | Marinaccio et al. |
| 5,137,458 A | 8/1992 | Ungs et al. |
| 5,146,566 A | 9/1992 | Hollis, Jr. et al. |
| 5,149,270 A | 9/1992 | McKeown |
| 5,165,897 A | 11/1992 | Johnson |
| 5,175,459 A | 12/1992 | Danial et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,203,563 A | 4/1993 | Loper, III |
| 5,205,289 A | 4/1993 | Hardy et al. |
| 5,212,473 A | 5/1993 | Louis |
| 5,217,003 A | 6/1993 | Wilk |
| 5,220,260 A | 6/1993 | Schuler |
| 5,230,623 A | 7/1993 | Guthrie et al. |
| 5,240,417 A | 8/1993 | Smithson et al. |
| 5,251,127 A | 10/1993 | Raab |
| 5,271,290 A | 12/1993 | Fischer |
| 5,273,038 A | 12/1993 | Beavin |
| 5,275,174 A | 1/1994 | Cook |
| 5,283,970 A | 2/1994 | Aigner |
| 5,290,276 A | 3/1994 | Sewell, Jr. |
| 5,295,694 A | 3/1994 | Levin |
| 5,296,871 A | 3/1994 | Paley |
| 5,299,810 A | 4/1994 | Pierce et al. |
| 5,309,140 A | 5/1994 | Everett, Jr. et al. |
| 5,320,537 A | 6/1994 | Watson |
| 5,333,106 A | 7/1994 | Lanpher et al. |
| 5,334,017 A | 8/1994 | Lang et al. |
| 5,334,027 A | 8/1994 | Wherlock |
| 5,338,198 A | 8/1994 | Wu et al. |
| 5,339,723 A | 8/1994 | Huitema |
| 5,351,692 A | 10/1994 | Dow et al. |
| 5,355,148 A | 10/1994 | Anderson |
| 5,368,487 A | 11/1994 | Medina |
| 5,376,007 A | 12/1994 | Zirm |
| 5,385,474 A | 1/1995 | Brindle |
| 5,388,992 A | 2/1995 | Franklin et al. |
| 5,391,081 A | 2/1995 | Lampotang et al. |
| 5,396,895 A | 3/1995 | Takashima et al. |
| 5,397,323 A | 3/1995 | Taylor et al. |
| 5,399,091 A | 3/1995 | Mitsumoto |
| 5,403,191 A | 4/1995 | Touson |
| 5,405,152 A | 4/1995 | Katanics et al. |
| 5,414,337 A | 5/1995 | Schuler |
| 5,417,210 A | 5/1995 | Funda et al. |
| 5,429,140 A | 7/1995 | Burdea et al. |
| 5,436,542 A | 7/1995 | Petelin et al. |
| 5,436,622 A | 7/1995 | Gutman et al. |
| 5,437,607 A | 8/1995 | Taylor |
| 5,445,166 A | 8/1995 | Taylor |
| 5,451,924 A | 9/1995 | Massimino et al. |
| 5,454,722 A | 10/1995 | Holland et al. |
| 5,466,213 A | 11/1995 | Hogan et al. |
| 5,467,763 A | 11/1995 | McMahon et al. |
| 5,482,472 A | 1/1996 | Garoni et al. |
| 5,483,961 A | 1/1996 | Kelly et al. |
| 5,506,605 A | 4/1996 | Paley |
| 5,509,810 A | 4/1996 | Schertz et al. |
| 5,510,832 A | 4/1996 | Garcia |
| 5,513,992 A | 5/1996 | Refait |
| 5,518,406 A | 5/1996 | Waters |
| 5,542,672 A | 8/1996 | Meredith |
| 5,546,943 A | 8/1996 | Gould |
| 5,547,382 A | 8/1996 | Yamasaki et al. |
| 5,550,562 A | 8/1996 | Aoki et al. |
| 5,565,840 A | 10/1996 | Thorner et al. |
| 5,575,761 A | 11/1996 | Hajianpour |
| 5,583,478 A | 12/1996 | Renzi |
| 5,589,828 A | 12/1996 | Armstrong |
| 5,589,854 A | 12/1996 | Tsai |
| 5,593,306 A | 1/1997 | Kohnke |
| 5,598,269 A | 1/1997 | Kitaevich et al. |
| 5,609,485 A | 3/1997 | Bergman et al. |
| 5,609,560 A | 3/1997 | Ichikawa et al. |
| 5,625,576 A | 4/1997 | Massie et al. |
| 5,629,594 A | 5/1997 | Jacobus et al. |
| 5,643,087 A | 7/1997 | Marcus et al. |
| 5,666,138 A | 9/1997 | Culver |
| 5,667,517 A | 9/1997 | Hooven |
| 5,684,722 A | 11/1997 | Thorner et al. |
| 5,690,582 A | 11/1997 | Ulrich et al. |
| 5,696,537 A | 12/1997 | Solhjell |
| 5,704,791 A | 1/1998 | Gillio |
| 5,709,219 A | 1/1998 | Chen et al. |
| 5,711,746 A | 1/1998 | Carlson |
| 5,714,978 A | 2/1998 | Yamanaka et al. |
| 5,720,742 A | 2/1998 | Zacharias |
| 5,722,836 A | 3/1998 | Younker |
| 5,734,373 A | 3/1998 | Rosenberg et al. |
| 5,736,978 A * | 4/1998 | Hasser et al. ............... 345/173 |

| | | | | | | |
|---|---|---|---|---|---|---|
| 5,742,278 A | 4/1998 | Chen et al. | | 6,160,489 A | 12/2000 | Perry et al. |
| 5,754,023 A | 5/1998 | Roston et al. | | 6,160,907 A | 12/2000 | Robotham et al. |
| 5,755,577 A | 5/1998 | Gillio | | 6,184,868 B1 | 2/2001 | Shahoian et al. |
| 5,766,016 A * | 6/1998 | Sinclair et al. ............. 434/262 | | 6,193,519 B1 | 2/2001 | Eggert et al. |
| 5,769,640 A | 6/1998 | Jacobus et al. | | 6,193,653 B1 | 2/2001 | Evans et al. |
| 5,779,209 A | 7/1998 | Rello | | 6,211,861 B1 | 4/2001 | Rosenberg et al. |
| 5,781,172 A | 7/1998 | Engel et al. | | 6,219,034 B1 * | 4/2001 | Elbing et al. ............... 345/158 |
| 5,784,052 A | 7/1998 | Keyson | | 6,223,100 B1 | 4/2001 | Green |
| 5,785,630 A | 7/1998 | Bobick et al. | | 6,246,391 B1 * | 6/2001 | Ong .......................... 345/156 |
| 5,790,108 A | 8/1998 | Salcudean et al. | | 6,358,187 B1 * | 3/2002 | Smith ............................ 482/4 |
| 5,791,908 A | 8/1998 | Gillio | | 6,373,463 B1 * | 4/2002 | Beeks ........................ 345/156 |
| 5,800,177 A | 9/1998 | Gillio | | 6,422,941 B1 | 7/2002 | Thorner et al. |
| 5,800,178 A | 9/1998 | Gillio | | 6,448,977 B1 | 9/2002 | Braun et al. |
| 5,800,179 A | 9/1998 | Bailey | | 6,473,069 B1 * | 10/2002 | Gerpheide ................... 345/157 |
| 5,802,353 A | 9/1998 | Avila et al. | | 6,507,349 B1 * | 1/2003 | Balassanian ................ 345/676 |
| 5,808,665 A | 9/1998 | Green | | 6,618,037 B2 * | 9/2003 | Sakamaki et al. .......... 345/163 |
| 5,817,107 A | 10/1998 | Schaller | | 2001/0016804 A1 | 8/2001 | Cunningham et al. |
| 5,825,308 A | 10/1998 | Rosenberg | | 2002/0021277 A1 * | 2/2002 | Kramer et al. .............. 345/156 |
| 5,844,392 A | 12/1998 | Peurach et al. | | 2003/0031993 A1 * | 2/2003 | Pugh .......................... 434/262 |
| 5,853,292 A | 12/1998 | Eggert et al. | | | | |
| 5,855,583 A | 1/1999 | Wang et al. | | FOREIGN PATENT DOCUMENTS | | |
| 5,857,986 A | 1/1999 | Moriyasu | | | | |
| 5,871,017 A | 2/1999 | Mayer | | EP | 0 265 011 A1 | 4/1988 |
| 5,873,731 A | 2/1999 | Prendergast | | EP | 0 349 086 A1 | 6/1989 |
| 5,873,732 A | 2/1999 | Hasson | | EP | 0 349 086 A1 | 1/1990 |
| 5,880,714 A | 3/1999 | Rosenberg et al. | | EP | 0 607 580 A1 | 12/1993 |
| 5,882,206 A | 3/1999 | Gillio | | EP | 0 626 634 A2 | 5/1994 |
| 5,882,207 A | 3/1999 | Lampotang et al. | | EP | 0 607 580 A1 | 7/1994 |
| 5,889,672 A | 3/1999 | Schuler et al. | | EP | 0 626 634 A2 | 11/1994 |
| 5,897,437 A | 4/1999 | Nishiumi et al. | | JP | H2-185278 | 7/1990 |
| 5,909,380 A | 6/1999 | Dubois et al. | | JP | H4-8381 | 1/1992 |
| 5,914,705 A | 6/1999 | Johnson et al. | | JP | H5-192449 | 8/1993 |
| 5,928,138 A | 7/1999 | Knight et al. | | JP | H7-24147 | 1/1995 |
| 5,944,151 A | 8/1999 | Jakobs et al. | | WO | 92/00559 | 1/1992 |
| 5,945,056 A | 8/1999 | Day et al. | | WO | WO 92/00559 | 1/1992 |
| 5,950,629 A | 9/1999 | Taylor et al. | | WO | 95/20788 | 5/1995 |
| 5,951,301 A | 9/1999 | Younker | | WO | WO 95/20788 | 8/1995 |
| 5,954,692 A | 9/1999 | Smith et al. | | WO | 97/31333 | 8/1997 |
| 5,956,484 A | 9/1999 | Rosenberg et al. | | WO | WO 97/31333 | 8/1997 |
| 5,957,694 A | 9/1999 | Bunch | | WO | 00/03319 | 1/2000 |
| 5,959,613 A | 9/1999 | Rosenberg et al. | | WO | WO 00/03319 | 1/2000 |
| 5,967,790 A | 10/1999 | Strover et al. | | | | |
| 5,967,980 A | 10/1999 | Ferre et al. | | OTHER PUBLICATIONS | | |
| 5,971,767 A | 10/1999 | Kaufman et al. | | | | |
| 5,971,976 A | 10/1999 | Wang et al. | | | | |
| 5,973,670 A * | 10/1999 | Barber et al. ............... 345/157 | | | | |
| 5,973,689 A | 10/1999 | Gallery | | | | |
| 5,982,353 A * | 11/1999 | Gallery et al. .............. 345/156 | | | | |
| 5,984,880 A | 11/1999 | Lander et al. | | | | |
| 5,986,643 A | 11/1999 | Harvill et al. | | | | |
| 5,990,869 A | 11/1999 | Kubica et al. | | | | |
| 6,001,014 A | 12/1999 | Ogata et al. | | | | |
| 6,004,134 A | 12/1999 | Marcus et al. | | | | |
| 6,005,551 A | 12/1999 | Osborne et al. | | | | |
| 6,006,127 A | 12/1999 | Van Der Brug et al. | | | | |
| 6,007,342 A | 12/1999 | Tjølsen | | | | |
| 6,020,876 A | 2/2000 | Rosenberg et al. | | | | |
| 6,028,593 A | 2/2000 | Rosenberg et al. | | | | |
| 6,038,488 A | 3/2000 | Barnes et al. | | | | |
| 6,061,004 A | 5/2000 | Rosenberg | | | | |
| 6,062,865 A | 5/2000 | Bailey | | | | |
| 6,077,082 A | 6/2000 | Gibson et al. | | | | |
| 6,078,308 A | 6/2000 | Rosenberg et al. | | | | |
| 6,086,528 A | 7/2000 | Adair | | | | |
| 6,088,017 A * | 7/2000 | Tremblay et al. ........... 345/156 | | | | |
| 6,088,019 A | 7/2000 | Rosenberg | | | | |
| 6,088,020 A | 7/2000 | Mor | | | | |
| 6,100,874 A | 8/2000 | Schena et al. | | | | |
| 6,106,301 A | 8/2000 | Merril | | | | |
| 6,111,577 A | 8/2000 | Zilles et al. | | | | |
| 6,113,395 A * | 9/2000 | Hon ........................... 434/262 | | | | |
| 6,126,450 A | 10/2000 | Mukai et al. | | | | |
| 6,157,367 A * | 12/2000 | Van Der Haar et al. .... 345/856 | | | | |

Dynamic Force Feedback in Virtual Knee Palpation.*

Baigrie, "Electric Control Loading— A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC—vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interfacing Dynamic Mechanical Systems Using Distributed Memory Parallel Processors," DSC—vol. 42, *Advances in Robotics*, pp. 55-61, ASME 1992.

Russo, "Controlling Dissipative Magnetic Particle Brakes in Force Reflective Devices," DSC—vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Buttolo et al., "Pen-Based Force Display for Precision Manipulation in Virtual Environments," 0-8186-7084 IEEE Mar. 1995, pp. 217-224.

Schmult et al., "Application Areas for A Force-Feedback Joystick," DSC—vol. 49, Advances in Robotics, Mechatronics, and Haptic Interfaces, ASME 1993, pp. 47-54.

Ellis et al., "Design and Evaluation of a High-Performance Prototype Planar Haptic Interface," DSC—vol. 49, Advances in Robotics, Mechatronics, and Haptic Interfaces, ASME Dec. 1993, pp. 55-65.

Hannaford et al., "Force-Feedback Cursor Control," NASA Tech Brief, vol. 13, No. 11, Item #21, Jet Propulsion Lab., Nov. 1989.

Kelley et al., "On the Development of a Force-Feedback Mouse and Its Integration Into a Graphical User Interface," Symp. on Haptic Interfaces for Virtual Envir. and Teleoperator Systems, 1994 Int'l Mech. Eng. Congress and Exhibition, Nov. 1994.

Iwata, H., "Artificial Reality with Force-Feedback: Development of Desktop Virtual Space with Compact Master Manipulator," Computer Graphics, vol. 24, No. 4, Aug. 1990, pp. 165-170.

Ramstein et al., "The Pantograph: A Large Workspace Haptic Device for a Multimodal Human-Computer Interaction," Computer-Human Interaction, CHI'94.

Rosenberg et al., "Commercially Viable Force Feedback Controller for Individuals with Neuromotor Disabilities," USAF Armstrong Lab., May 1996.

Su et al., "The Virtual Panel Architecture: A 3D Gesture Framework," Computer Science Depts., Univ. of Maryland, Texas A&M Univ., Jan. 1993.

Adachi et al., "Sensory Evaluation of Virtual Haptic Push-Buttons," Technical Research Center, Suzuki Motor Corp., 1994.

Rosenberg, L., "A Force Feedback Programming Primer—For PC Gaming Peripherals Supporting I-Force 2.0 and Direct—X 5.0," Immersion Corporation, 1997.

Hasser, C., "Tactile Feedback For a Force-Reflecting Haptic Display," School of Engineering, Univ. of Dayton, Dec. 1995.

Hasser, C. et al., "Tactile Feedback With Adaptive Controller for a Force-Reflecting Haptic Display—Part 1: Design," IEEE 0-7803-3131, Jan. 1996.

Dennerlein, Jack T. et al., "Vibrotactile Feedback for Industrial Telemanipulators," 6.sup.th Ann. Symposium on Haptic Interfaces for Virtual Environment and Teleoperator Systems, ASME IMECE, Nov. 1997.

Akamatsu, M. et al., "Multimodal Mouse: A Mouse-Type Device With Tactile and Force Display," Presence, vol. 3, No. 4, Winter 1994, pp. 73-80.

Kelley, A.J. et al., "MagicMouse: Tactile and Kinesthetic Feedback in the Human-Computer Interface Using an Electromagnetically Actuated Input/Output Device," Dept. of Elec. Eng., Univ. of British Columbia, Oct. 1993, pp. 1-27.

Ramstein, C., "Combining Haptic and Braille Technologies: Design Issues and Pilot Study," ACM 0-89791-776 Jun. 1996, pp. 37-44.

Payette, J. et al., "Evaluation of a Force Feedback (Haptic) Computer Pointing Device in Zero Gravity," DSC—vol. 58, Proc. of ASME Dynamics Systems and Control Division, ASME 1996, pp. 547-553.

Wiker, S. et al., "Development of Tactile Mice for Blind Access to Computers: Importance of Stimulation Locus, Object Size, and Vibrotactile Display Resolution," Proc. of Human Factors Society 35.sup.th Annual Meeting 1991, pp. 708-712.

Kühnapfel et al., "Models for Simulating Instrument-tissue Interactions," MMVR 2001, Newport Beach, Jan. 27, 2001.

Peine, "Remove Palpation Instruments for Minimally Invasive Surgery," http://www.hrl.harvard.edu/~peine/rpi.html.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC—vol. 55-1, *Dynamic Systems and Control:* vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

Bostrom, Mikael, et al.; "Design of An Interactive Lumbar Puncture Simulator With Tactile Feedback"; VR, Sep. 1993; pp. 280-286.

Dinsmore, Michael, et al.; "Virtual Reality Training Simulation for Palpation of Subsurface Tumors"; Computer Society Press; not earlier than Jan. 1997; pp. 54-60.

Erdman, A.G., et al.; "Kinematic and Kinetic Analysis of the Human Wrist by Stereoscopic Instrumentation"; J. Biomechanical Engineering; vol. 101, No. 2; May 1979; pp. 124-133.

Gibson, Sarah, et al.; "Simulating Arthroscopic Knee Surgery using Volumetric Object Representations, Real-Time Volume Rendering and Haptic Feedback"; Lecture Notes in Computer Science, 1205; Oct. 1996; pp. 369-374.

Marcus, Beth; "Touch Feedback In Surgery"; SIG-Advanced Applications, Inc.; Sep. 1994; pp. 96-97.

Marcus, Beth; "Hands On: Haptic Feedback in Surgical Simulation"; Medicine Meets Virtual Reality II; Interactive Technology & Healthcare: Visionary Applications for Simulation Visualization Robotics; at least as early as Jan. 1994; pp. 134-139.

Kühnapfel, U.; "Models for simulating instrument-tissue interactions"; 9th Medicine Meets Virtual Reality 2001 (MMVR 2001); Jan. 2001; 40 pgs.

Wang, Yong-Jun, et al.; "Force Feedback Assisted Nasoscope Virtual Surgery Simulator"; J. System Simulation, vol. 13, No. 3; May 2001; pp. 404-407.

Ackerman, M.J., "The Visible Human Project," Proceedings of the IEEE, vol. 86, No. 3, pp. 504-511, Mar. 1998.

Cover, Steven A, et al., "Interactively Deformable Models for Surgery Simulation," IEEE Computer Graphics and Applications, vol. 13, No. 6, pp. 68-75, 1993.

Dawson Steven L. et al., "The Imperative for Medical Simulation," Proceedings of the IEEE, vol. 86, No. 3, pp. 479-483, Mar. 1998.

Delingette, Herve, "Toward Realistic Soft-Tissue Modeling in Medical Simulation," Proceedings of the IEEE, vol. 86, No. 3, pp. 512-523, Mar. 1998.

Krüger, W. et al., "The Responsive Workbench," IEEE Computer Graphics and Applications, vol. 14, No. 3, pp. 12-15, May 1994.

Langrana, Noshir A. "Dynamic Force Feedback in a Virtual Knee Palpation, Artifical Intelligence in Medicine", pp. 322-333, 1994.

Okie, Susan, "Out of Body Medicine: Doctors Turn to Computer Simulators to Enhance Their Skills", The Washington Post, 4 pp, 1996, Final Edition Correction Appended, HEALTH; p. Z12.

Satava, R. M. "The Role of Virtual Reality in Medicine of the 21st Century", Virtual Reality Systems, vol. 1 (2), pp. 64-67, 1993, Fall.

Satava R. M. and Jones S. B. "Current and Future Applications of Virtual Reality for Medicine", Proceedings of the IEEE, 86(3), 1998.

Shahidi R, Tombropoulos R, Grzeszczuk R "Clinical Applications of Three-Dimensional Rendering of Medical Data-Sets" Journal of Proceedings of IEEE. 1998; 86: 3: 555-568.

Smith, G., "Call It Palpable Progress," Business Week, Oct. 9, 1995, pp. 93, 96.-- no issue no.

Soferman, Z., Blythe, D., and John, N.W. "Advanced graphics behind medical virtual reality: evolution of algorithms, hardware, and software interfaces," Proceedings of the IEEE, vol. 86, No. 3, pp. 531-554.

Taubes, Gary, "Surgery in cyberspace," Discover, pp. 85-92, Dec. 1994.

* cited by examiner

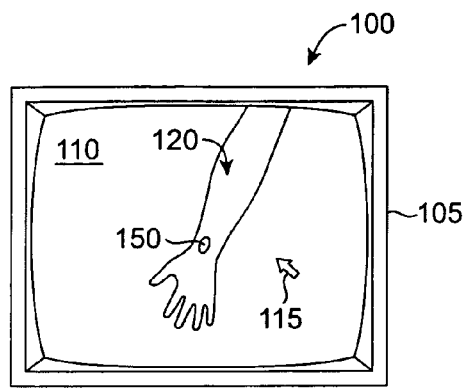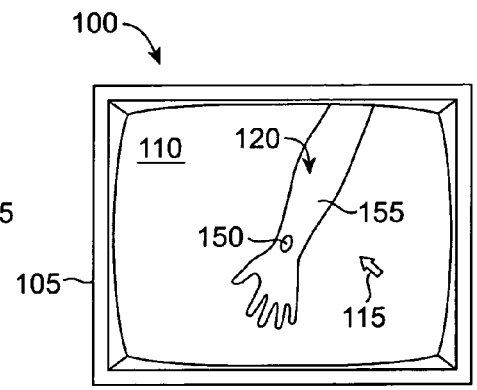
FIG. 2A    FIG. 2B
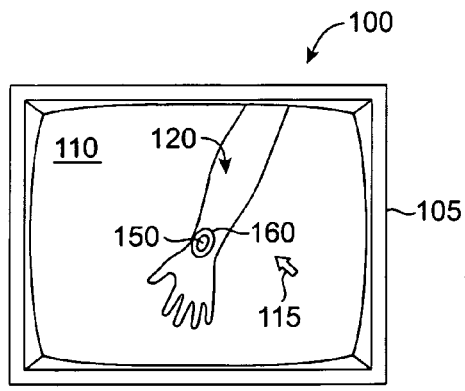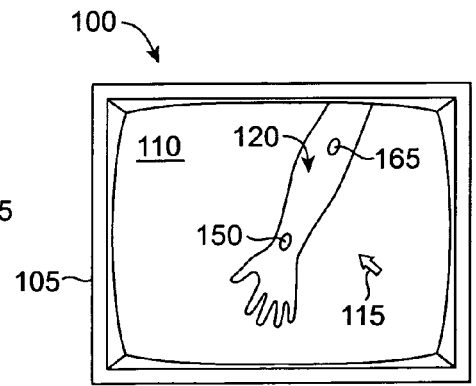
FIG. 2C    FIG. 2D

HAPTIC INTERFACE FOR PALPATION SIMULATION

BACKGROUND

The present invention relates to interfacing a user with a computer, such as a computer for performing a medical training simulation.

Medical practitioners often provide hands-on medical care. For example, a physician, nurse, care-giver, or other individual may need to perform a touch-related procedure on a patient. In these touch-related procedures, the medical practitioner uses a body part, such as one or more fingers or hands, to contact a surface on or in a body of a patient. The medical practitioner then may use his or her sense of touch to assess a condition of the patient or to treat the patient. One touch-related diagnostic procedure is palpation. Palpation relates to a physical examination with one or more fingers, hands or other body part to feel or detect by the sense of touch a condition of the body or the location of a part of the body. A palpation procedure may be performed by a medical practitioner to make a locative determination, to make a diagnostic assessment, and/or to therapeutically treat the patient. For example, by properly palpating a region, the medical practitioner can locate a feature, such as a vein, artery, lymph node, organ, cellular abnormality, bone or other hard tissue, or other feature, underlying the skin in that region. By careful feeling of a feature, the medical practitioner can make objective or subjective determinations of abnormal conditions. Also, a medical practitioner or other person can use palpation to perform a vascular assessment on a patient. Vascular assessment procedures, such as pulse rate, pulse strength, thrill detection, etc., provide the medical practitioner with a preliminary determination of a vascular condition.

The effectiveness of a palpation procedure is dependent on the skill of the person performing the procedure. However, palpation is a difficult procedure to train. Typically, the medical practitioner is trained clinically, through direct contact with patients. Early in the trainee's career, the likelihood of judgmental errors or diagnostic oversights may be high due to the medical practitioner's limited palpation experience. Even when properly supervised, training on actual patients is less than desirable since the trainee is unable to experiment and explore without risking injury to the patient. In addition, it is difficult to expose even experienced medical practitioners with uncommon palpation scenarios or with rare abnormalities.

To lessen the amount of training on actual patients, training simulators have been developed. In one training simulator, a physical mannequin is used to train the medical practitioner in performing a touch-related procedure. However, the physical mannequin can be cumbersome and difficult to manufacture. Additionally, the physical mannequin is limited in the number of situations that can be demonstrated. Another training simulator consists of a computer simulation of a patient's pulse. However, this computer simulator does not provide the trainee with a simulation of the feel of the procedure. Instead, the computer merely provides visual and/or audible pulsation feedback to the trainee. Thus, the trainee does not come away from the simulation having experienced the procedure through his or her sense of touch, nor does the computer simulator of pulse allow for the simulation of other palpation related procedures.

SUMMARY

To overcome the deficiencies of the prior art, it is desirable to be able to simulate a touch-related procedure in a way that is experienced through a user's sense of touch. It is further desirable to provide a haptic simulation of a touch-related procedure, such as a palpation procedure. It is also desirable to provide a realistic simulation of a touch-related procedure using a compact and easily portable simulator.

The present invention satisfies these needs. In one aspect of the invention, a method for interfacing a user with a computer running an application program, the computer generating a graphical environment comprising a cursor and a graphical representation of at least a portion of a living body, comprises providing an object in communication with the computer, controlling the cursor in relation to manipulation of at least a portion of the object by the user, and outputting a haptic sensation to the user when the cursor interacts with a region within the graphical representation to provide the user with haptic feedback related to a simulated palpation of the region.

In another aspect of the invention, a method for interfacing a user with a computer running an application program, the computer generating a graphical environment comprising a cursor and a graphical representation of at least a portion of a living body, comprises providing an object in communication with the computer, controlling the cursor in relation to manipulation of at least a portion of the object by the user, and outputting a haptic sensation to the user when the cursor interacts with the graphical representation to simulate a pulse of the living body.

In another aspect of the invention, a method for interfacing a user with a computer running an application program, the computer generating a graphical environment comprising a cursor and a graphical representation of at least a portion of a living body, comprises providing an object in communication with the computer, controlling the cursor in relation to manipulation of at least a portion of the object by the user, and outputting a haptic sensation to the user when the cursor interacts with the graphical representation to simulate a palpated feature on or below the surface of the graphical representation.

In another aspect of the invention, a palpation simulator comprises a computer readable medium comprising a computer readable program including program instructions to cause a palpation simulation to be executed on a computer, and to cause the computer to generate a cursor and a graphical representation of at least a portion of a living body, an object in communication with the computer, at least a portion of the object being manipulatable by a user, a sensor in communication with the computer and coupled to the object to detect a manipulation of the at least a portion of the object to control the cursor, and an actuator coupled to the object to output a haptic sensation to the user when the cursor interacts with a region within the graphical representation, the haptic sensation simulating a palpation of the living body.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIGS. 2A–2D are examples of graphical environments that may be generated by versions of the simulation system of the present invention;

Figure 10:
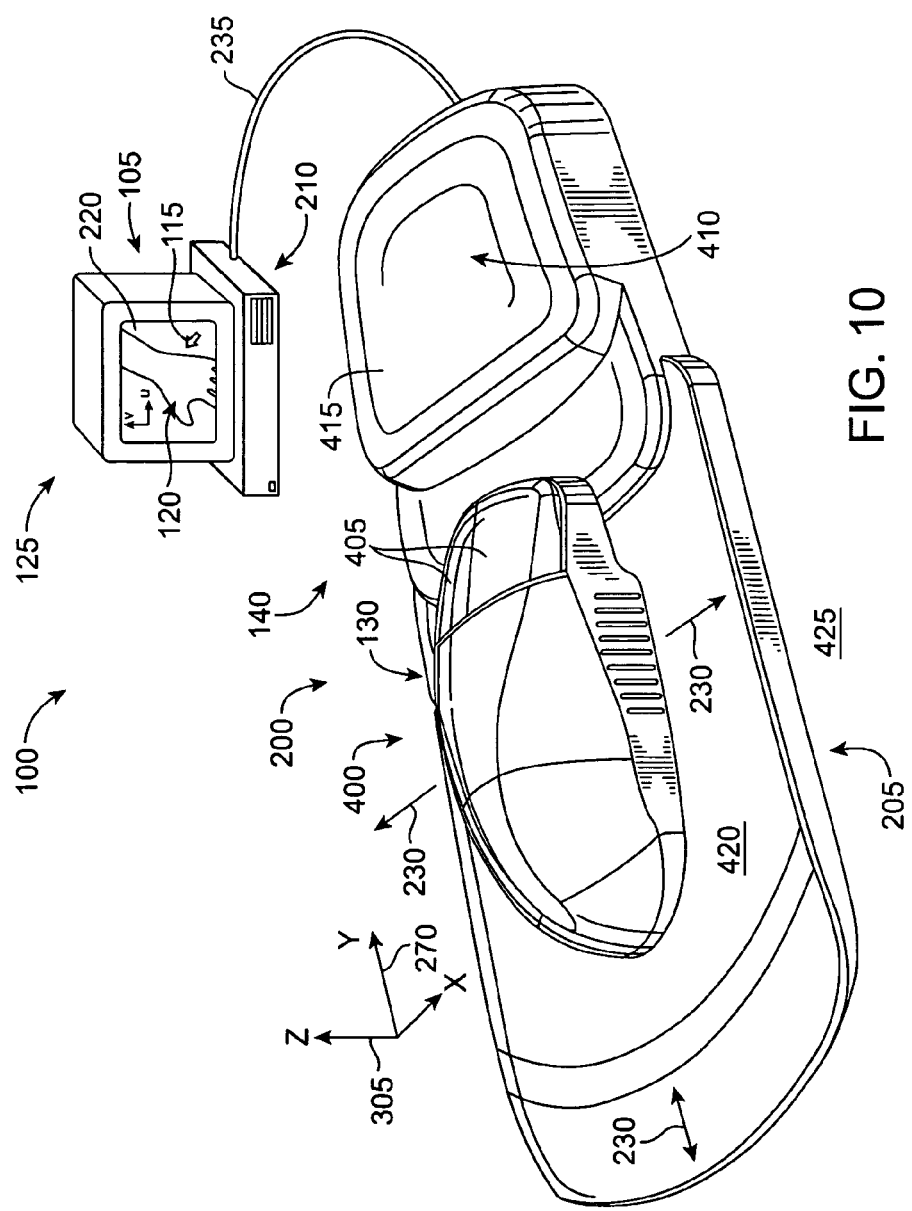
FIG. 10 is a schematic perspective view of a kinesthetic force feedback mouse that may be used as a haptic interface in a simulation system according to the present invention.
Figure 11A:
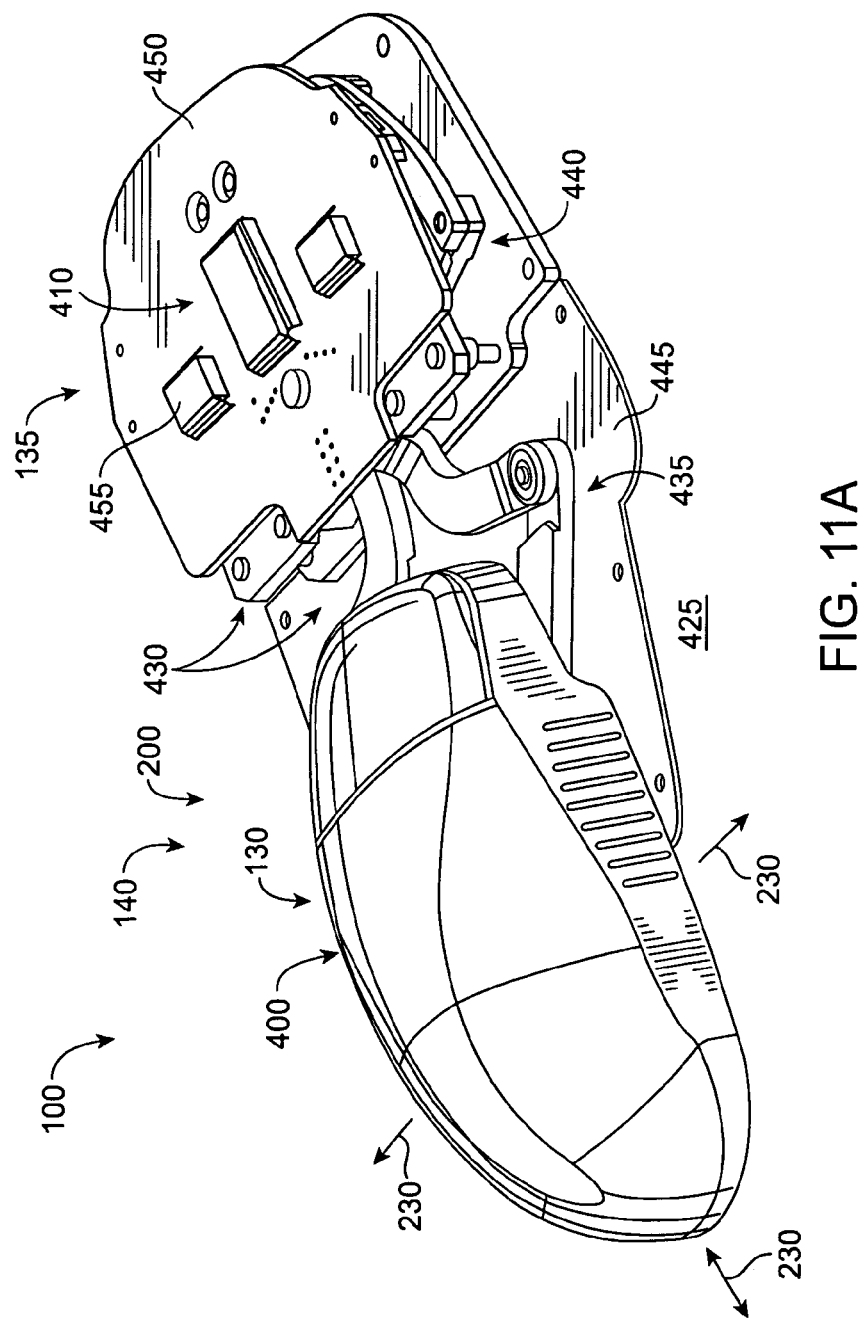
Figure 11B:
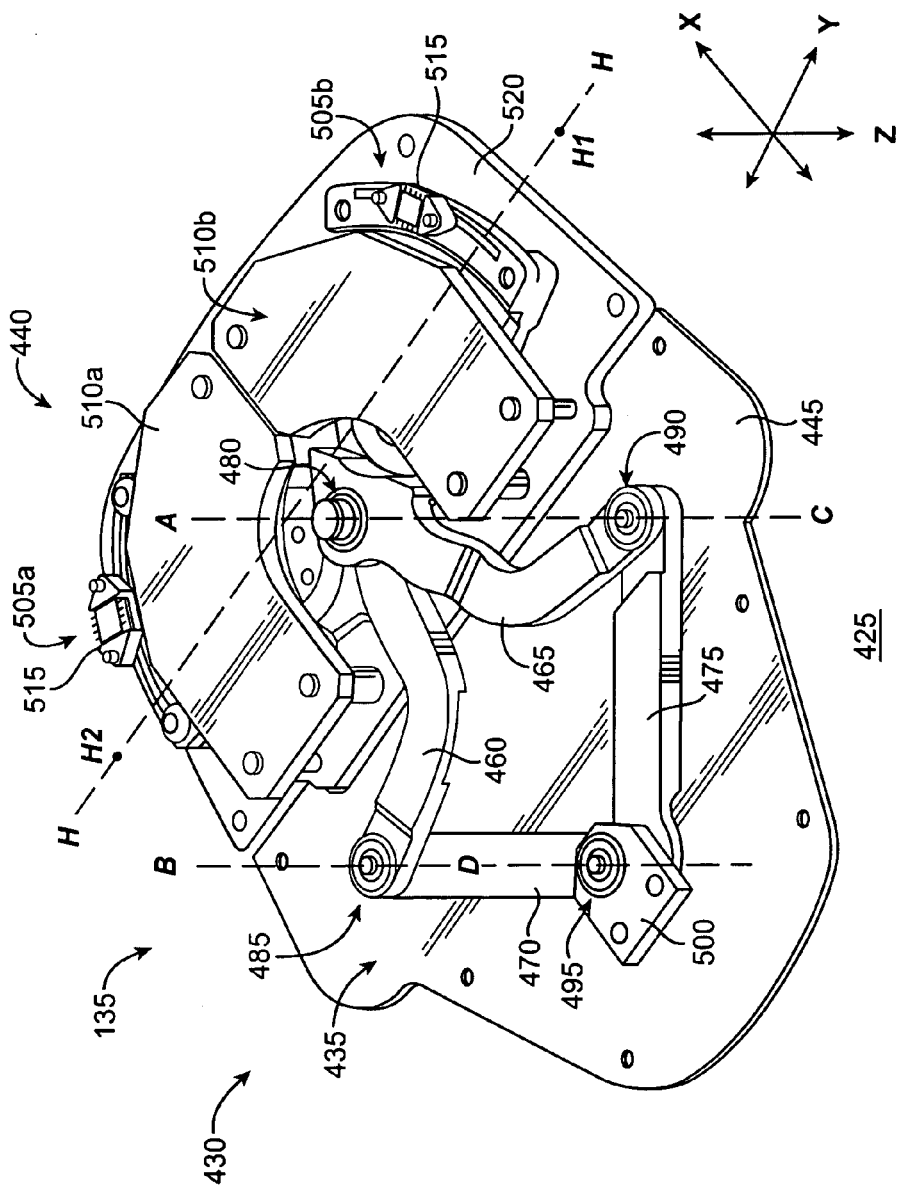
Figure 11C:
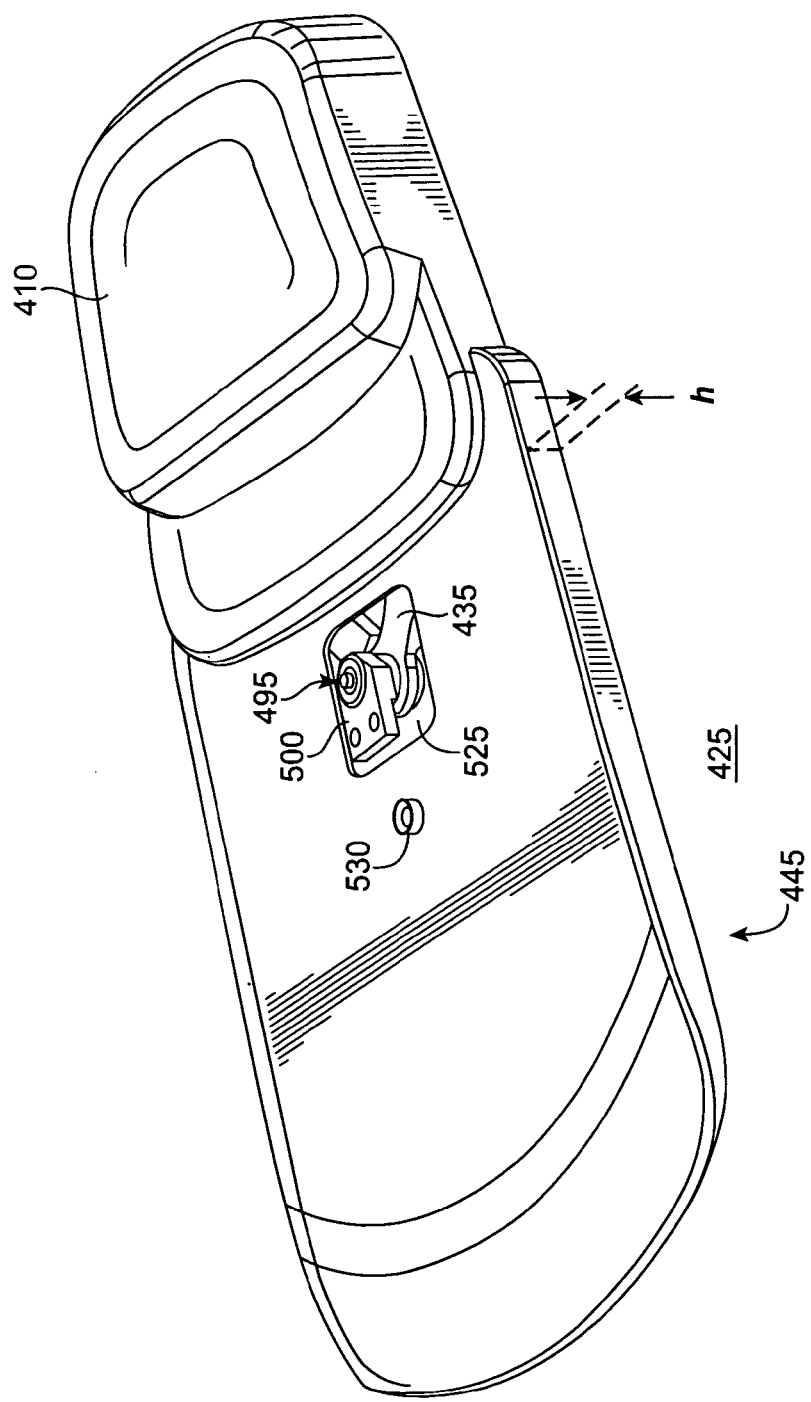
Figure 12:
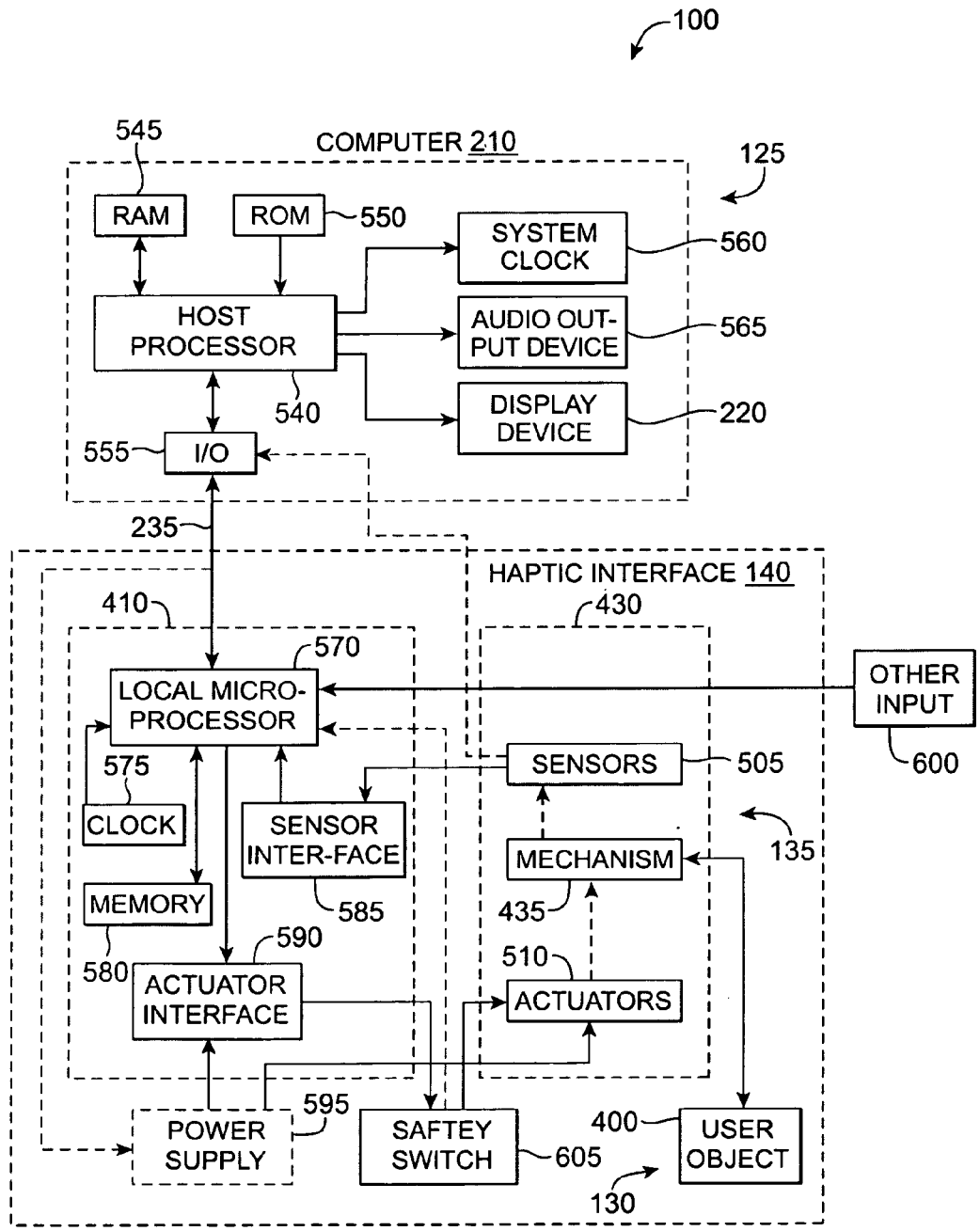
Figure 13C:
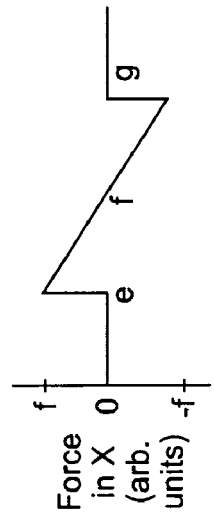
Figure 13D:
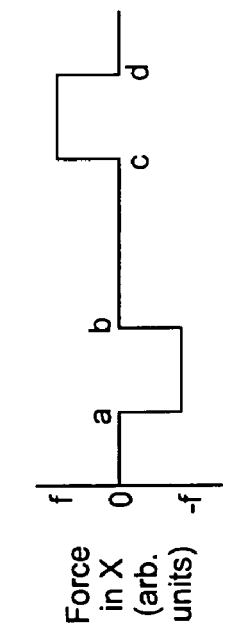
Figure 13A:
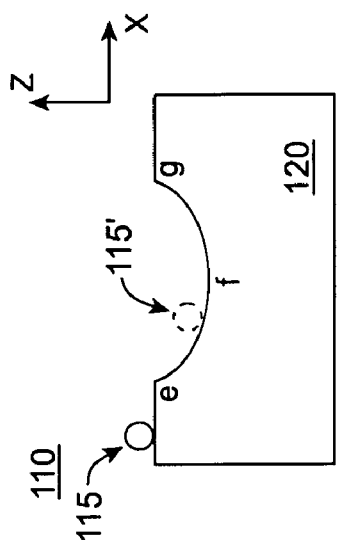
Figure 13B:
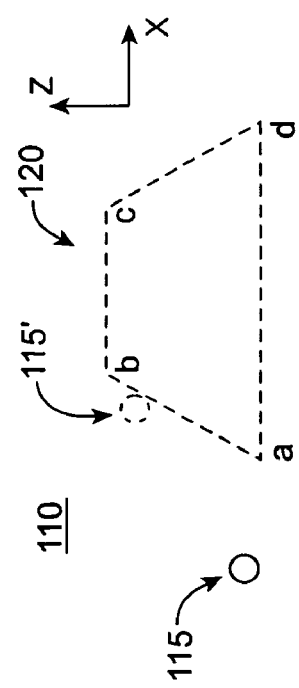
Figure 15A:
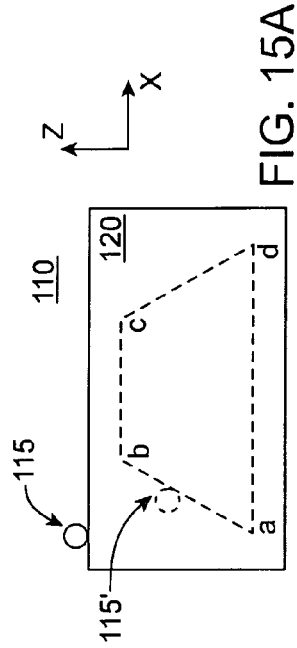
Figure 15B:
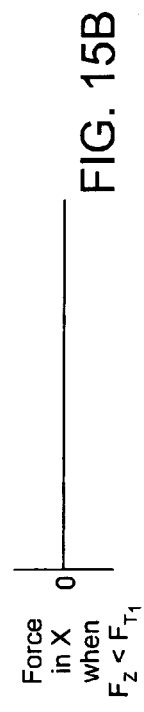
Figure 15C:
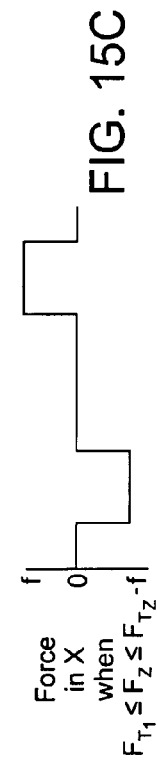
Figure 15D:
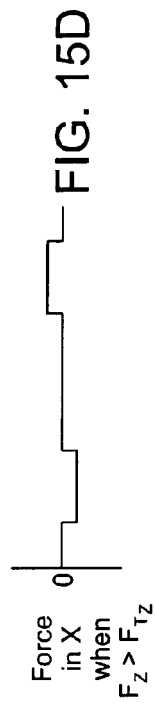
Figure 14A:
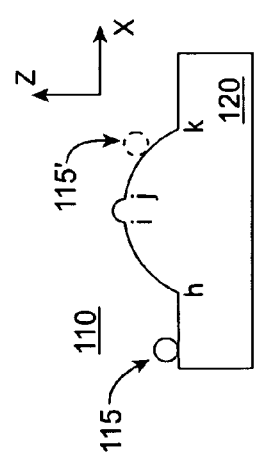
Figure 14B:
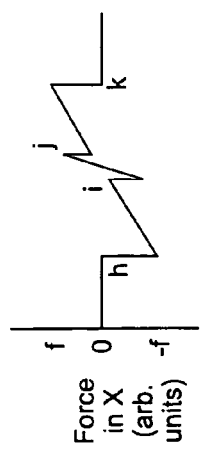
Figure 16:
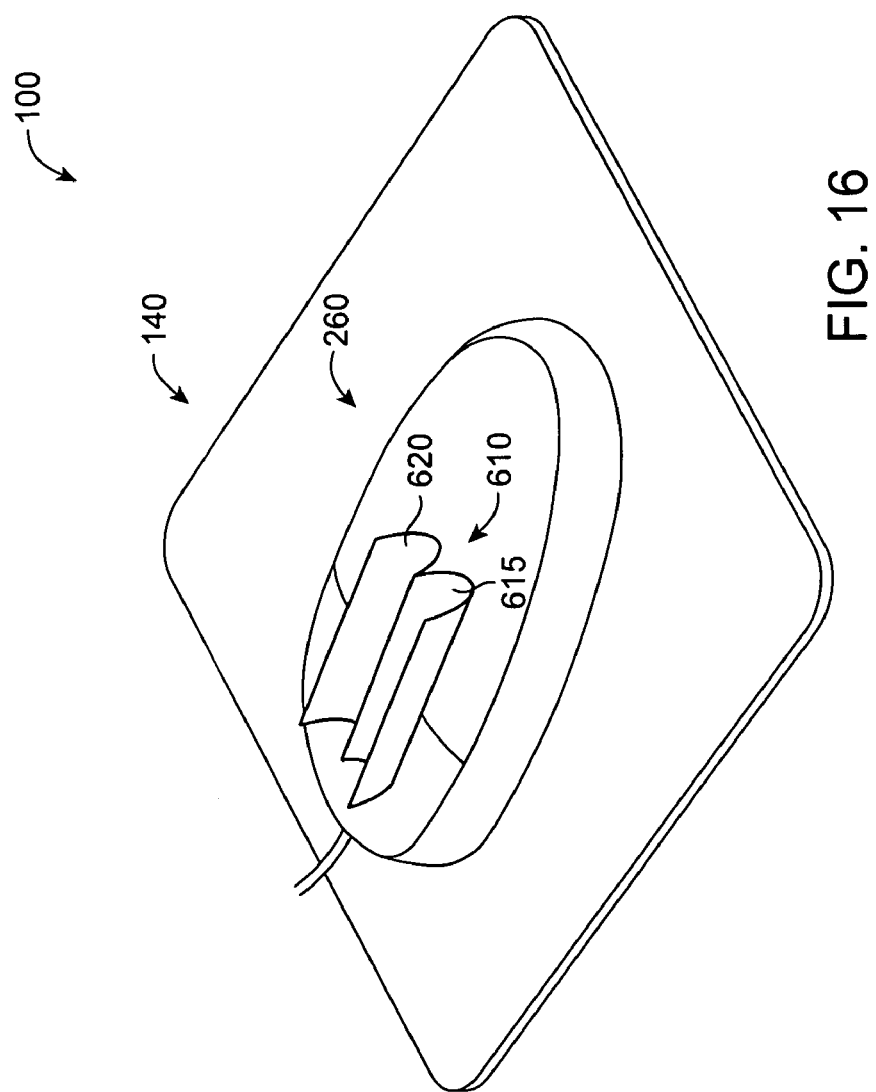

FIGS. 11A, 11B, and 11C are schematic perspective views of the kinesthetic force feedback mouse of FIG. 10 showing the electronic and mechanical interfaces of the mouse and a platform for the mouse;

FIG. 12 is a block diagram schematically illustrating a version of a simulation system with a kinesthetic force feedback mouse;

FIG. 13A is a schematic illustrating a graphical representation that may be generated by a simulation system;

FIG. 13B shows a haptic sensation force profile associated with the graphical representation of FIG. 13A;

FIG. 13C is a schematic illustrating another graphical representation that may be generated by a simulation system;

FIG. 13D shows a haptic sensation force profile associated with the graphical representation of FIG. 13C;

FIG. 14A is a schematic illustrating a graphical representation of a body part that may be generated by a simulation system;

FIG. 14B shows a haptic sensation force profile associated with the graphical representation of FIG. 14A;

FIG. 15A is a schematic illustrating a graphical representation of a body part with an underlying feature that may be generated by a simulation system;

FIGS. 15B–D show haptic sensation force profiles associated with the graphical representation of FIG. 15A, each corresponding to different z-axis forces applied by a user; and FIG. 16 is a version of a mouse that may be used with the simulation system according to the present invention.

DESCRIPTION

The present invention relates to computer simulations and more particularly to computer simulations involving haptic feedback. Although the process is illustrated in the context of medical training simulations, the present invention can be used in other simulation and computer interactive processes and should not be limited to the examples provided herein.

Figure 1:
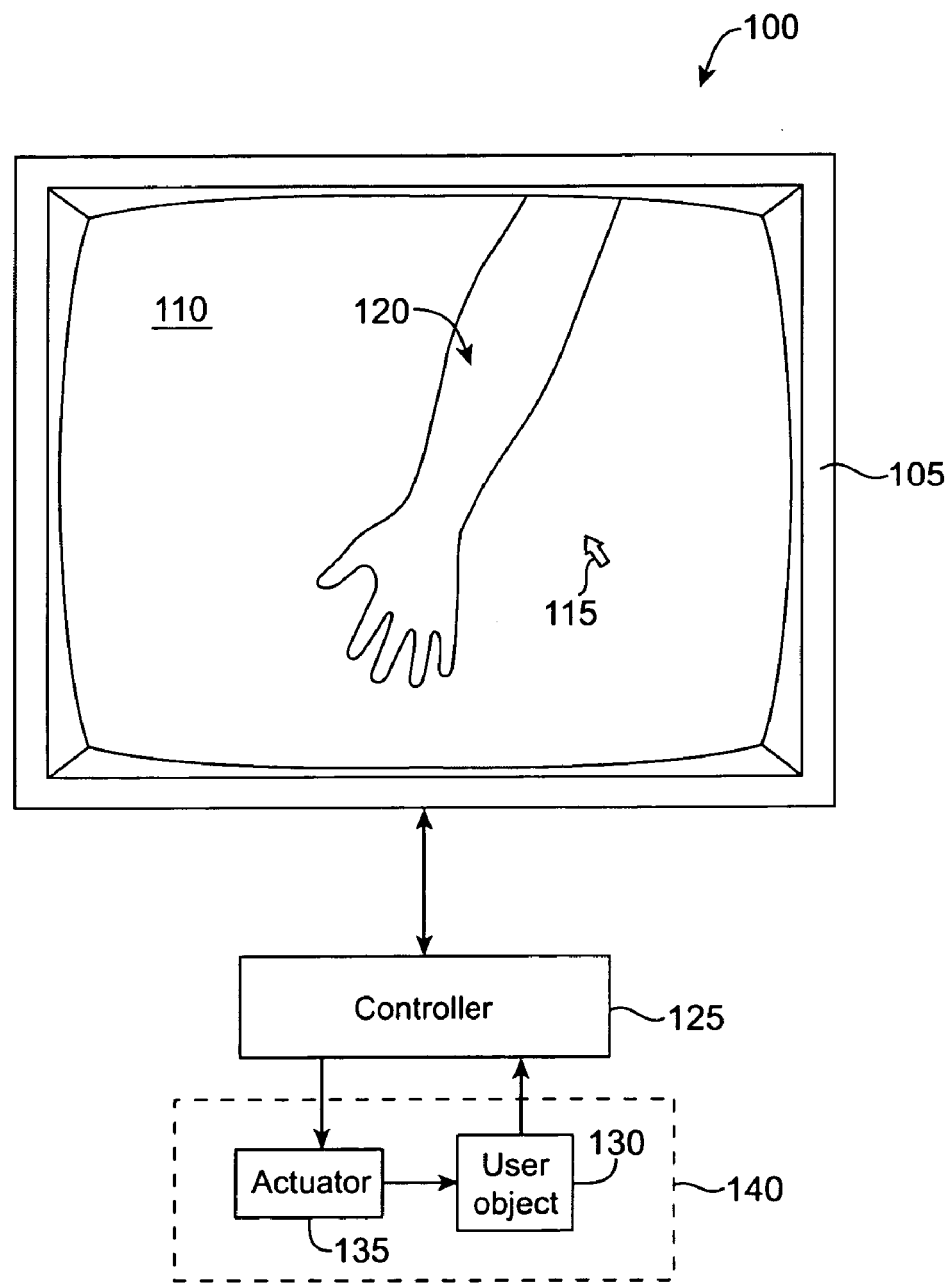
FIG. 1 is a schematic view of a simulation system according to the present invention.

FIG. 1 is a schematic illustration of a simulation system 100 according to the invention. A display 105 provides a graphical environment 110 to a user. Within the graphical environment 110 is a cursor 115, such as the arrow cursor shown in FIG. 1. By cursor it is meant any cursor or object, the position, movement, shape, or the like of which is controllable. Also within the graphical environment 110 is a graphical representation 120 such as a graphical representation of at least a portion of a living body. For example, the graphical representation 120 may comprise a human body, a portion of a human body, an animal body, or a portion of an animal body. A controller 125 in communication with the display 105 is capable of generating and/or controlling the graphical environment 110. A user object 130 is manipulatable by a user, and the manipulation of the user object 130 controls the position of the cursor 115 within the graphical environment 110, for example by directly correlating a position of the user object 130 with a displayed position of the cursor 115 or by correlating a position of the user object with a rate of movement of the cursor 115. Either the entire user object 130 may be manipulatable by the user or a portion of the user object 130 may be manipulatable relative to another portion of the user object 130. For example, the user object may be a surface that is engaged by one or more hands of a user, such as a joystick, a mouse, a mouse housing, a stylus, a knob, an elongated rigid or flexible member, an instrumented glove, or the like and may be moveable in from one to six degrees of freedom or more.

When a predetermined event occurs within the graphical environment 110, such as an interaction of the cursor 115 with the graphical representation 120, the controller 125 causes an actuator 135 to output a haptic sensation to the user. In the version shown, the actuator 135 outputs the haptic sensation to the user object 130 through which the sensation is provided to the user. In the version shown, the actuator 135 and the user object 130 are part of a haptic interface device 140. The actuator 135 may be positioned in the haptic interface device 140 to apply a force to the user object 130 or to a portion of the user object. For example, the haptic interface device 140 may comprise a user object 130, such as a mouse housing, having an actuator 135 within the user object 130, such as a vibrating motor within the mouse housing, or the haptic interface device may comprise a user object 130, such as a mouse, that is mechanically linked to an actuator 135.

The actuator 135 may provide the haptic sensation actively or passively. For example, the actuator 135 may comprise one or more motors coupled to the user object 130 to apply a force to the user object 130 in one or more degrees of freedom. Alternatively or additionally, the actuator 135 may comprise one or more braking mechanisms coupled to the user object to inhibit movement of the user object 130 in one or more degrees of freedom. By haptic sensation it is meant any sensation provided to the user that is related to the users sense of touch. For example, the haptic sensation may comprise kinesthetic force feedback and/or tactile feedback. By kinesthetic force feedback it is meant any active or passive force applied to the user to simulate a force that would be experienced in the graphical environment 110, such as a grounded force applied to the user object 130 to simulate a force acting on at least a portion of the cursor 115. For example, if the cursor 115 is positioned against a surface, a barrier, or an obstruction, the actuator 135 may output a force against the user object 130 preventing or retarding movement of the user object 130 in the direction of the surface, barrier or, obstruction. By tactile feedback it is meant any active or passive force applied to the user to provide the user with a tactile indication of a predetermined occurrence within the graphical environment 110. For example, a vibration, click, pop, or the like may be output to the user when the cursor 115 interacts with a graphical object. Additionally, tactile feedback may comprise a tactile sensation applied to approximate or give the illusion of a kinesthetic force. For example, by varying the frequency and/or the amplitude of an applied vibration, variations in surface textures of different graphical objects can be simulated, or by providing a series of clicks when a cursor penetrates an object, resistance to the penetration can be simulated. In one exemplary version, a kinesthetic force sensation, such as a spring force, may be applied to the user whenever the cursor 115 engages the graphical representation 120 to simulate a selectively deformable surface. Alternatively or additionally, a tactile sensation, such as a pop, may be applied to the user when the cursor 115 is moved across a surface of the graphical representation 120 to simulate a texture of the graphical representation 120.

The simulation system 100 may, in one version, perform a medical simulation. The medical simulation may be a virtual reality simulation where the user interacts with the graphical environment 110 by manipulation of the user object 130 and by receiving visual, audible, and/or haptic feedback of the interaction. In the version shown in FIG. 1, haptic feedback is output to the user in response to a predetermined interaction between the cursor 115 and the graphical representation 120. For example, when user object 130 is manipulated so as to cause the cursor 115 to be positioned on or in contact with the graphical representation 120, a haptic sensation is provided by the actuator 135 to the user object 130 in accordance with program code within or in communication with the controller 125. The simulation system 100 may simulate a touch-related procedure. During the touch-related procedure, the user may be provided with a haptic sensation related to the simulation of touch interaction of the user with the graphical representation 120.

A haptic sensation may be applied to the user when the cursor 115 interacts with the graphical representation 120 or with a portion of the graphical representation 120. For example, as shown in FIG. 2A, the graphical representation 120 may comprise one or more first regions 150. When the cursor 115 interacts with a first region 150, such as by being positioned within or adjacent to the first region 150, a haptic sensation is applied to the user. The one or more first regions 150 may or may not be displayed to the user in the graphical environment 110. In addition, the graphical representation 120 may comprise one or more second regions, the simulation system being adapted to apply a second haptic sensation to the user with the cursor 115 interacts with the second region. The version of FIG. 2B shows a second region comprising the portion 155 of the graphical representation 120 other than the first region 150. In FIG. 2C, the second region is a portion 160 at least partially surrounding the first region 150. Alternatively, the second region may comprise a region 165 within the graphical representation 120 spaced from the first region 150.

In one version, the simulation system 100 may allow a user, such as a medical practitioner trainee, to simulate palpation of a living body. By palpation it is meant any therapeutic, diagnostic or other procedure where a medical practitioner contacts a patient with a portion of the medical practitioner's body, such as one or more fingers and/or hands, and utilizes his or her sense of touch to treat, diagnose or otherwise care for or administer to the patient. A medical practitioner may use palpation to locate and/or evaluate exterior or interior anatomical features or masses in or on the patient's body. For example, the medical practitioner may feel for organs or other tissues, cellular masses, abnormalities, vascular conditions, bone conditions, vibrations of the chest, etc. The vascular conditions may be conditions related to the flow of blood in the patient, such as pulse rate or strength, or other blood flow conditions, such as vascular thrill.

The simulation system 100 may, in one version comprise a palpation trainer. In this version, the controller 125 or other device may be capable of executing an application program comprising palpation training program code. The palpation training program is designed to configurably instruct a trainee on proper palpation techniques and/or to present the trainee with various palpation scenarios. The palpation training program may control the output of haptic sensations to the user of the simulation system 100 to provide the user with an immersive experience that allows the user to learn the palpation procedure through his or her sense of touch. This is advantageous over prior trainers or classrooms which attempt to train medical practitioners visually or audibly rather than by training through the actual sense that the medical practitioner will have to use when performing actual palpation procedures on actual patients. The palpation trainer according to the invention is also advantageous over mannequin trainers in its economy of size and space and in that the scenarios that may be generated are more numerous than in a mechanical model. In addition, the use of the simulation system 100 is advantageous over a clinical setting since the trainee may experiment with, for example, how hard to press or in what areas to press or feel without the fear of injuring or causing discomfort to a patient.

The simulation system 100 comprising a palpation training program may generate a graphical environment 110, such as the graphical environment shown in FIG. 1. The palpation program may cause the simulation system 100 to task the user to position the cursor 115 at a target, which may or may not be displayed to the user, on or near the graphic representation 120. For example, the tasking may comprise the presentation of a visual or an audible instruction to the user. Alternatively, an instructor may task the user. As the user causes the cursor 115 to interact with the cursor 120, the simulation system causes a haptic sensation to be output to the user. In a simple form, a tactile cue, such as a pop, is output to the user when the cursor 115 intersects a boundary of the graphical representation 120. This relatively simple version allows the user to interact with the simulation system 100 and to receive information through the user's sense of touch. As a result, the user utilizes the sense, i.e. the sense of touch, that the user will use during actual palpation procedures on a patient, thus creating a more authentic simulation.

In another version, a haptic sensation may be output to a user when the user causes the cursor 115 to interact with the graphical representation 120 in a predetermined manner. For example, the target to which the user is tasked to locate, may be associated with a region of the graphical representation 120, such as the first region 150 shown in FIG. 2A. In this version, the simulation system 100 may provide a haptic sensation, such as a tactile sensation, when the cursor 115 has been located at or is within a predetermined distance of the target. This provides an authentic simulation that trains the user to concentrate on touch input at or near a targeted area. To further create an authentic simulation, a first haptic sensation may be output to the user when the cursor 115 interacts with the first region 150 and a second haptic sensation may be output to a user when the cursor 115 interacts with a second region on the graphical representation 120. For example, a first haptic sensation may indicate to the user that the target has been located and the second haptic sensation may indicate that a non-targeted area of the graphical representation 120 is being interacted with. For example, as shown in the schematic of the graphical environment 110 in FIG. 2B, the second haptic sensation may be output when the cursor 115 intersects the portion 155 other than the first region 150 and maybe indicative of the interaction of the cursor 115 with, for example, the skin, such as by presenting a texture sensation or a deformable surface sensation. In another version, as shown in FIG. 2C, the second haptic sensation may be applied when the cursor 115 interacts with a region 160 near the first region 150, for example, by presenting a scaled version of the haptic sensation output when the cursor 115 is in the first region 150. In the version of FIG. 2D, the second haptic sensation may be applied when the cursor 115 interacts with a portion 165 spaced from the first region 150. The second haptic sensation may be associated with a second targeted area or may be a scaled version of the first haptic sensation. In any of the versions shown in FIGS. 2A though 2D, third, fourth, fifth, etc. haptic sensations may be associated with predetermined regions of the graphical representation to further increase the authenticity of the simulation. For example, in the version of FIG. 2C, a skin texture haptic sensation may be applied when the cursor 115 intersects the graphical representation 120 outside the first region 150 or the surrounding region 160.

In a particular example of the simulation system 100, the simulation system 100 may comprise a palpation trainer adapted to train a user to properly locate and/or evaluate a blood flow condition, such as a pulse of a living body. Pulse is the rhythmical expansion and contraction of an artery that can be felt near the surface of a body. The rate, strength and regularity of the pulse may be an indication of the pumping action of the heart and may vary with age and/or activity. For example, the pulse rate of a young baby may be as high as 120 to 140 beats per minute and may be on average about 70 beats per minute for a resting adult. A trained athlete at the extreme of physical effort may have a pulse rate of up to 180 beats per minute, with a resting pulse rate of less than 60 beats per minute. Any of these conditions may be simulated by the simulation system 100. Certain determinations can be made from an evaluation of a pulse. For example, an ectopic beat, or a missed beat, may be sensed by evaluating a pulse. This may provide an indication some underlying form of heart disease. Also, rapid pulse rates, also known as tachycardia, and slow pulse rates, also known as bradycardia, may be detected. Irregular pulse rates may be an indication of atrial fibrillation.

In one version of the pulse trainer, the first region 150, as shown for example in FIG. 2A, may be representative of an area on the graphical representation 120 where a pulse may be felt by a user. The haptic sensation associated with the first region 150 may be a tactile sensation simulating the feel of a pulse. For example, the user object 130 may output to the user a vibration having a repeating waveform and having a predetermined amplitude and frequency to simulate the sensation of a pulse. The amplitude may be variable and may be a function of the position of the cursor 115. For example, the amplitude may be at a maximum at the center of the first region 150 and may diminish as the cursor position approaches the periphery of the first region 150. In another version, as shown for example in FIG. 2C, a first amplitude may be associated with the first region 150 and a second amplitude may be associated with the surrounding region 160.

In use, the pulse trainer may task the user to find and/or take the pulse of an individual represented by the graphical representation 120. A portion of the living body may then be displayed and the user may be tasked with positioning the cursor 115 at a pulse taking location. In one version, a user may be tasked with precisely locating a specific pulse-taking location. For example, as shown in FIG. 2A, a forearm of a simulated patient may be displayed as the graphical representation 120 and within the forearm representation may be nested a region 150 corresponding to a position in the wrist area where the pulse can be detected from the radial artery. The pulse trainer may then instruct the user to locate a position where the pulse may be taken from the radial artery. When the user correctly locates the region 150 a haptic sensation indicating to the user the pulse has been correctly located and/or simulating a pulse sensation may be output to the user. Alternatively or additionally, a user may be tasked with more general instructions, such as "locate a pulse." In one version, two or more pulse locating areas may be within the graphical representation 120. For example, as shown in the version of FIG. 2D, a first region 150 may be associated with a radial artery pulse taking location and a second region 165 may be associated with a brachial artery pulse taking location. The user may then locate the pulse at either location. The haptic sensation may be the same for the different regions or may vary, for example by varying in magnitude. In this version, the user may be taught through the sense of touch which pulse taking regions are best for a given orientation of the body or body shape.

The pulse trainer may present one or more training scenarios which present to the user one or more haptic sensations associated with the pulse or with another blood flow condition. For example, for beginners, the simulation system 100 may visually or audibly provide the user information such as or similar to: "Learning to take a pulse: You can feel a pulse at many locations where an artery is positioned close to an outer surface of a body. The pulse is particularly easy to feel in positions where the artery lies across a bone. The usual place to take a patient's pulse is at the wrist. Place the first and second fingers of your hand gently on the patient's wrist about 1 inch (2.5 cm) above the base of the thumb. After a few seconds, you should feel the beats of the pulse through the radial artery. Count the number of beats during one full minute by watching the second hand of a clock or wristwatch. Alternatively count the number of beats for 15 seconds and multiply the number of counted beats by four." In conjunction with this, the user may position the cursor 115 at the patient's wrist and receive a corresponding haptic sensation, such as a low frequency vibration simulating a pulse. The pulse sensation may be applied immediately or may be delayed. In another version, the haptic device 140 is caused to physically move or guide the user to the correct location by the simulation system 100 to provide initial training. Alternatively or additionally, the simulation system 100 may include other pulse scenarios. For example, the user may be tasked with locating another pulse site, such as one or more of the temporal, carotid, apical, brachial, radial, femoral, popliteal, posterior tibial, dosalis pedis, or the like arterial sites. The simulation system 100 may also inform the user of additional information and/or pose a second task to the user. In one version, after the user has adequately located the correct position on the wrist to take a pulse, the user may be informed: "An alternative place to take the pulse is just in front of the ear, where the temporal artery passes to the forehead" and then the user may be tasked to locate this position on the graphical representation 120 which may then be in the form of the head of a patient. Alternatively, the graphical representation 120 may be in the form of a full body during both scenarios.

Figure 3:
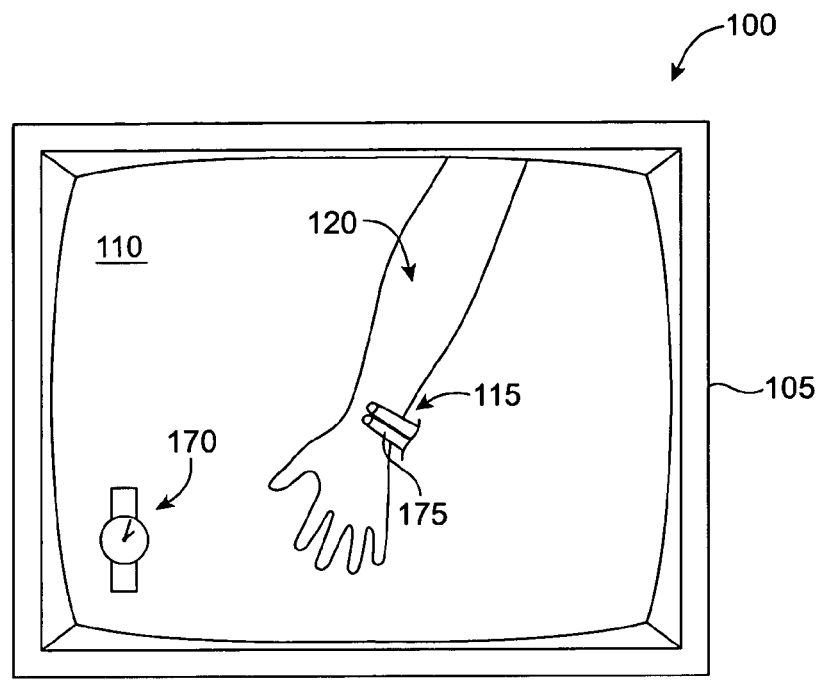
FIG. 3 is a graphical environment generated by a version of a pulse training simulation system.

In more advanced training routines, the trainee may be taught to evaluate the detected pulse. For example, the simulation system 100 may instruct the user that: "If no pulse can be detected from extreme locations such as the wrist or the temporal artery, the patient may have collapsed from shock or undergone cardiac arrest. The only place that a pulse can then be felt is over the carotid artery where it passes up the neck next to the Adam's apple." The simulation system 100 may then task the user with finding this location and/or may task the user to make diagnostic determinations based on the relative strengths of the pulse at multiple locations. In another version, the user may be tasked with evaluating the detected pulse at a particular site. For example, the user may be presented various pulse rates and tasked with determining the pulse rate. The simulation system 100 may display a simulated watch 170 or other timer, as shown in FIG. 3, to allow the user to practice counting the number of beats for 15 seconds, a minute, or for another period of time. Alternatively or in a different mode, no timer may be shown in order to allow the trainee to acquire an intuitive knowledge of an approximate pulse rate. Various pulse rates and/or pulse strengths may be presented to the user and the user may be asked to estimate the pulse rate to allow the user to gain this fundamental and intuitive knowledge. For more advanced trainees, the haptic sensation may, for example, simulate tachycardia, bradycardia, thrill or other vascular related conditions and the user may be tasked with accurately detecting the presented condition. In another version, different species of animals may be graphically represented, and the trainee may be tasked with locating one or more pulse taking locations for each displayed animal. For example, a veterinary student or trainee may be presented with a series of pulse taking scenarios related to a dog, a cat, a bird, etc. In any of the above scenarios, other graphical images and/or audible signals may be provided. For example, the graphical environment 110 may comprise an image of a stethoscope to instruct the user how to properly position the stethoscope to listen to blood flow and/or breathing sounds. The simulation system 100 coordinates the audible, visual, and/or haptic outputs provided to the user.

The cursor 115 displayed to the user and representative of the user in the graphical environment 110 may appear as an extension of the user. For example, the cursor 115 may resemble the body part of the user that would be used by the user during an actual palpation procedure. In the version shown in FIG. 3 where the simulation system 100 comprises a pulse trainer, the cursor 115 takes the form of one or more fingers 175, such as the first and second fingers of the right hand, to create a more authentic virtual reality environment to the user. Alternatively, the orientation of the fingers may be altered and/or more or less of the body part may be displayed. Additionally, the orientation of the cursor 115 may be adjustable when using a user object 130 with a sensed rotational degree of freedom, such as when using an instrument glove or the like, or through keyboard instruction or the like.

Figure 4:
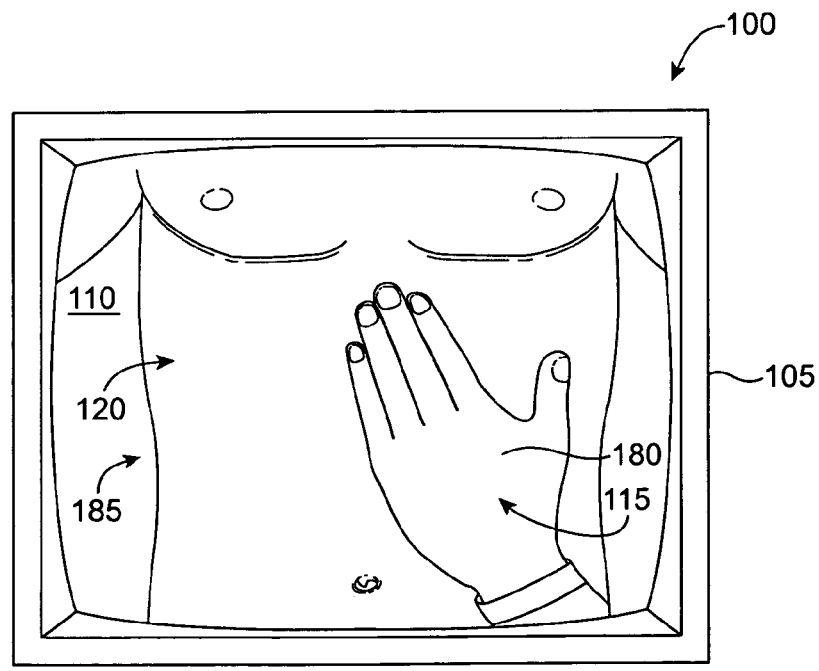
FIG. 4 is a graphical environment generated by a version of a palpation training simulation system.

In another particular example of the simulation system 100, the simulation system 100 may comprise a palpation trainer adapted to train a user to properly locate and/or evaluate a feature under the surface of a living body or on or near the surface of a living body. Medical practitioners often touch and feel at least a portion of a patient's body with his or her hands to examine the size, consistency, texture, location, or tenderness of an organ or body part. For example, a palpation procedure may be used to: 1) locate an anatomical feature below the surface of the skin, such as a blood vessel during a vascular access procedure; 2) locate an internal organ, such as a liver, for anatomical or diagnostic purposes and/or evaluate an internal organ, such as by evaluating the size, resiliency or tenderness of a liver, to make at least a preliminary determination of the condition of the internal organ or the patient; 3) locate hard tissue, such as a bone or cartilage, in the body and/or examine a condition of the hard tissue, such as making a preliminary fracture evaluation or detecting calcification of bony tissue; 4) test the strength of tendons and/or ligaments of the body, such as testing the condition of the ligaments of a knee by examining the amount of side to side play that exists between the tibia and the femur; 5) locate and examine lymph nodes to detect abnormal conditions thereof; 6) examine tissues, such as a breast or a testicle, for the presence of a cellular mass and/or a tumor that might be indicative of a disease state that warrants further investigation; 6) locate foreign objects in the body; and/or 7) otherwise locate soft or hard tissue for the purpose of evaluating, treating, caring for, or administering to the tissue, such as by providing therapeutic massage. A version of a graphical environment 110 associated with a version of a palpation trainer is shown in FIG. 4. In this version, an entire hand 180 may be displayed as the cursor 115 to provide a realistic simulation of the procedure. Though a left hand is shown, either hand (or both hands) may be displayed and controlled by the user object 130.

The simulation system 100 comprising a palpation trainer may present feature location and/or evaluation scenarios to the trainee. For example, a version of an abdominal evaluation trainer will now be described for the purpose of illustrating concepts of the invention. The training session may comprise one or more of the following interactive graphical environments or situations.

The simulation system 100 may begin by displaying a graphical representation 120 representing the abdominal region 185 of a patient, the cursor 115 may or may not be displayed during this portion of the training. The simulation system 100 may then inform the user either visually or audibly that: "An evaluation of the abdominal region may begin with inspection. Look at the abdomen and the abdominal contour and note any asymmetry, the location of scars, rashes, or other lesions." The simulation system 100 may present asymmetry and/or scar, rash, or lesion scenarios to the user and may provide a location for the recordation of such by the user.

Next, the user may be informed: "Normally, auscultation occurs after a complete palpation procedure. However, when evaluating the abdomen, it is often desirable to perform auscultation before palpation due to the possibility of altering conditions during the palpation process. Begin by recording bowel sounds as being present, increased, decreased, or absent." At this time, the simulation system 100 may generate a graphical object representing a stethoscope (not shown in FIG. 4) to allow the user to simulate auscultation. According to program code, the sounds may either be normal or may indicate an abnormal condition. The simulation system 100 may allow the user to sample various sounds or may present only a single sound to the user in order to test or evaluate the user. The simulation may continue by informing the user: "In addition to bowel sounds, abdominal bruits are sometimes heard. Listen over the aorta, renal, and iliac arteries." Scenarios related to bruits may then be presented. The user may be tasked to determine which bruits are representative of diseased states and which are not, for example bruits confined to systole do not necessarily indicate disease. More advanced training systems may task the user to determine, for example, the difference between a bruit and a heart murmur transmitted to the abdominal region.

The user may then be tasked with performing percussion on the abdomen. For example, the user may be provided information relevant to an examination, such as: "With the patient in a supine position, perform percussion on the patient. A tympanic sensation will be present over most of the abdomen in a healthy individual. However, a dullness may be a clue to an underlying abdominal mass." The graphical representation 120 may then be shown as though the patient were in a supine position. The user may then be tasked to position the cursor 115, such as the graphical image of a hand 180, over portions of the abdomen on which percussion is to be performed. When the cursor is correctly positioned, a haptic sensation may be provided to the user. Alternatively or additionally, continuous haptic sensations indicative of the contour of the abdomen (or other body part in other procedures) may be provided so that the user is provided with kinesthetic force feedback of the feel of the graphical image 120. Percussion, which is normally performed by using a second hand to strike a finger in contact with the patient may then be simulated. In a simple form, the percussion may be simulated by depression of a digital or analog button on the user object 130. This will cause the graphical environment 110 to display another hand performing a percussion on the cursor 115 hand. The vibrations resulting from the simulated percussion may then be applied to the user haptically through the user object 130. In this way, the user will be able to detect the difference between the tympanic sensation and the dull sensation. Various percussion scenarios may be presented, for example, the user may be tasked with: "Measure the liver span by percussing hepatic dullness from near the lungs and from near the bowel. A normal liver span is 6 to 12 cm in the midclavicular line." A user may then learn to make a liver size determination. Continuing, the simulation system 100 may inform the user: "To detect an enlarged spleen, percuss the lowest interspace in the left anterior axillary line. After the patient takes a deep breath, a change in the sensation from a tympany to a dull signal may suggest an enlarged spleen." The user then locates the correct positions for the percussion, at which time a haptic sensation may be provided, and the user then makes diagnostic determinations based on the haptic sensations applied to the user.

The user may then be instructed how to properly examine the region using the sense of touch. For example, the simulation system 100 may inform the user: "After percussion, begin with light palpation on the surface of the body and watch the patient for areas of tenderness. The most sensitive indicator of tenderness is the patient's facial expression. Voluntary or involuntary guarding of a region may also be present." The simulation system 100 may display a graphic representation of the face selectively showing, in various degrees, discomfort or may audibly simulate sounds of discomfort coming from the patient. Haptic feedback during the portion of the training may include surface contour indications either via tactile sensations or kinesthetic force sensations. Next, the user is instructed: "Proceed to deep palpation. Pressing gently but deeply into the abdomen, identify abdominal masses and areas of deep tenderness." The user then simulates a deep palpation technique, and haptic sensations indicative of deeply felt features are fed back to the user. In one version, tactile sensations or lateral forces indicate to the user the presence of internal features. In another version, the user object 130 is manipulatable in three dimensions and a force may be applied to the user object 130 that simulates the force experienced when pressing into the patient. In another version, a force sensor may be provided on the user object that detects the force applied by the user to control the display of the cursor 115 in relation to the graphical representation 120 so that the user has to apply a force in order to deeply palpate the patient. Haptic effects may be provided during the application of the force to simulate the presence of deep features.

During the deep palpation, organs may be located and evaluated. For example, the user may be informed: "Palpate the edge of the liver. Place your fingers just below the costal margin and press firmly. As the patient takes a deep breath, you may feel the edge of the liver press against or slide under your hand. A normal liver is not tender." The simulation system 100 may provide to the user a haptic sensation indicating that the liver and/or the liver edge has been properly located. The user may then simulate the asking of the patient to take a deep breath, for example by pressing a button or the like, after which a haptic sensation simulating the movement of the liver may be applied to the user. The simulation may then continue to task the user to find other organs. For example: "Try to feel the spleen. Press down just below the left costal margin with your right hand while asking the patient to take a deep breath. If necessary, use your left hand to lift the lower rib cage and flank. A palpable spleen may be indicative of a diseased condition." The user may then be presented with a spleen haptic sensation indicating, for example, an inflamed or ruptured spleen.

The above training process may be altered. For example, in each of the described graphical environments 110, the location of a feature may or may not be visually displayed. For example, a feature, such as a liver, may be shown in phantom, or may be shown when a user graphically selects a button causing the feature to be shown. Alternatively to the instruction process described above, one or more scenarios may be provided to the user without the instructional information. This version may be used to test or evaluate a user's ability level. Also, other palpation procedures may be similarly simulated using the simulation system 100. For example, the simulation system 100 may instruct a user on how to properly locate a vein in the arm, how to properly evaluate chest vibrations during breathing or talking, how to assess trauma by feeling a joint, how to beneficially and non-traumatically give a therapeutic massage to a portion of the body, etc.

In addition to being useful in training medical practitioners, a palpation trainer is also useful in teaching a patient to treat and/or evaluate themselves. For example, a breast tumor locating simulation procedure may be used to teach a woman or her partner how to properly examine the woman's breasts for abnormalities. Additionally, a patient with a fistula or a graft may use a palpation trainer to learn how to properly feel for a vibration related to a vascular thrill. Lack of thrill can be indicative of a clot in the access and should be checked by the patient on a daily basis. The palpation trainer may be used to teach the patient how the blood flow condition should feel and present scenarios that should indicate to the user that a physician should be contacted.

The haptic interface device 140 may be designed to provide authentic haptic interaction between the user and the graphical environment 110. In a relatively simple version, the user object 130 may be, for example, a one degree of freedom interface device, such as a rotatable knob or a linearly insertable elongated member. In another version, the user object 130 is moveable in at least two linear degrees of freedom. In more complex versions, the user object may be movable in three dimensions. For example, the haptic interface device 140 may comprise a three to six degree of freedom interface device such as those described in U.S. Pat. Nos. 5,701,140 and 5,828,197 which are available from Immersion Corporation in San Jose, Calif., both of which are incorporated herein by reference in their entireties, and in U.S. Pat. No. 5,625,576 which is incorporated herein by reference in its entirety. By providing these additional actuatable degrees of freedom, kinesthetic forces can be applied in three dimensions to provide an authentic virtual reality experience to the user of the simulating system 100. An even more advanced simulation system 100 may comprise a graphical hand controller that is capable of not only positioning the cursor 115 comprising a hand 180, but is also capable of controlling the position of one or more of the fingers on the hand, such as by using a Cyberglove™, Cybergrasp™ or Cyberforce™ device described in U.S. Pat. Nos. 5,631,861 and 6,042,555 which are available from Virtual Technologies, Inc. of Palo Alto, Calif., both patents being incorporated herein by reference in their entireties.

Figure 5:
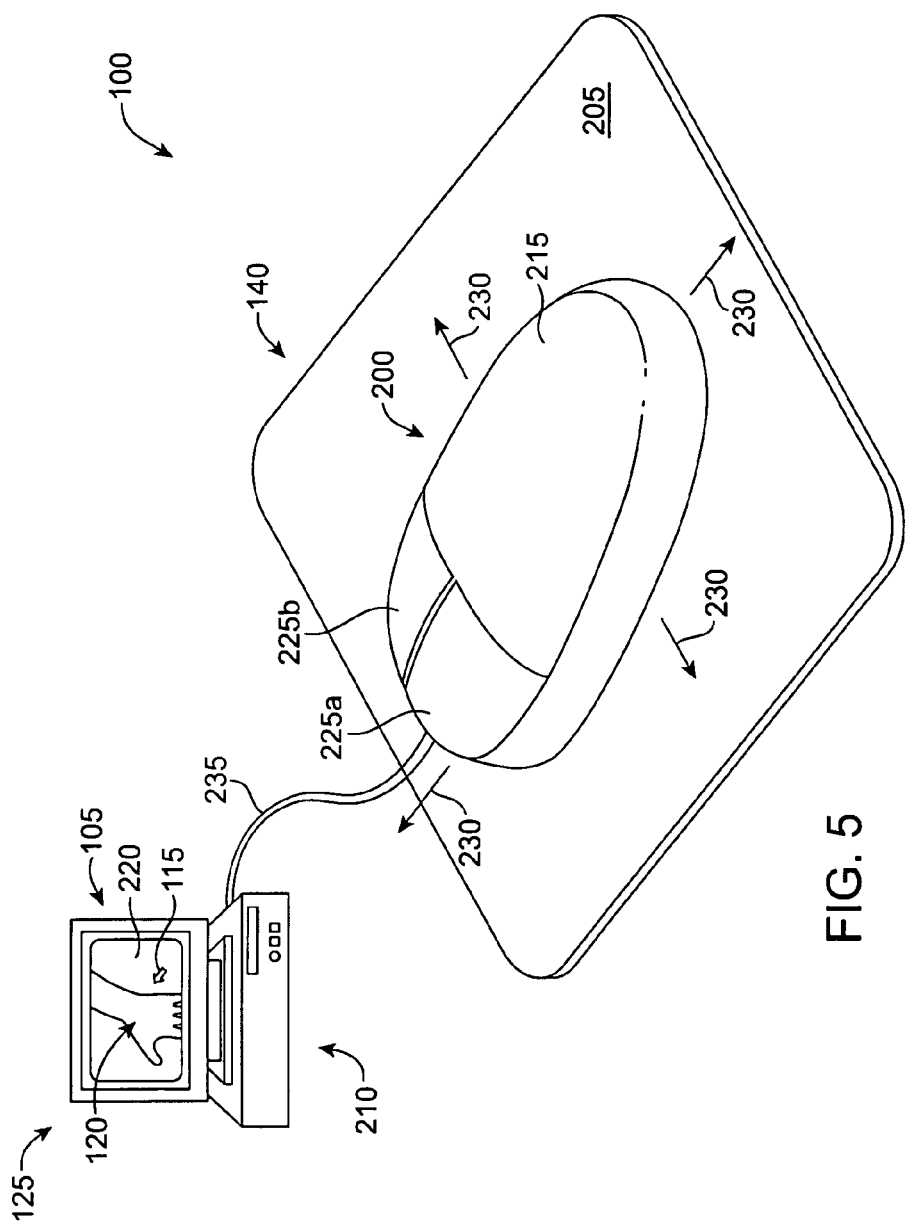
FIG. 5 is a schematic perspective view of a mouse device which may be used as a haptic interface in a simulation system according to the present invention.

In a particular version of the simulation system 100, the haptic interface device 140 comprises a mouse 200 which is manipulatable in a planar workspace 205 by a user, as shown for example in FIG. 5. This version is convenient and inexpensive to implement while still providing an advantageous haptic feedback experience to the user. U.S. Pat. Nos. 6,211,861, 6,100,874, 6,166,723, U.S. patent application Ser. No. 09/585,741 filed on Jun. 2, 2000, and U.S. Provisional Patent Application No. 60/224,584 filed on Oct. 11, 2000 describe versions of haptic mice and are incorporated herein by reference in their entireties.

FIG. 5 is a perspective view schematically illustrating a version of a simulation system 100 of the present invention where the controller 125 is implemented in a computer 210 and the haptic interface device 140 comprises a mouse 200. Either the entire mouse 200 may serve as the actuatable user object 130 or the housing 215 of the mouse 200 may serve as the actuatable user object 130. As the mouse 200 is manipulated by a user, its position is detected and the manipulation is communicated to the computer 210 to, for example, control the positioning of the cursor 115 on a computer screen 220. Mouse 200 is an object that is engaged and manipulated by a user. In the described embodiment, mouse 200 is shaped so that a user's fingers or hand may comfortably grasp the object and move it in the provided degrees of freedom in physical space. For example, a user can move mouse 200 to provide planar two-dimensional input to a computer system to correspondingly move a cursor 115, such as an arrow cursor, a cursor representing a portion of a user as discussed above, or a virtual character, vehicle, or other entity in a game or simulation, in a graphical environment 110 provided by computer 210. In addition, mouse 200 may include one or more buttons 225a and 225b to allow the user to provide additional commands to the computer 210. The mouse 200 may also include additional buttons. For example, a thumb button can be included on one side of the housing 215 of mouse 200. Typically, the mouse 200 is a smooth- or angular-shaped compact unit that is designed to fit under a user's hand, fingers, and/or palm, but can also be implemented as a grip, finger cradle, cylinder, sphere, planar object, etc.

In the version shown in FIG. 5, the computer 210 may comprise a processor and may be capable of executing program code. For example, the computer 210 may be a personal computer or workstation, such as a PC compatible computer or Macintosh personal computer, or a Sun or Silicon Graphics workstation. The computer 210 may be operable under the Windows™, MacOS, Unix, or MS-DOS operating system or similar. Alternatively, the computer 210 can be one of a variety of home video game console systems commonly connected to a television set or other display, such as systems available from Nintendo, Sega, or Sony. In other embodiments, the computer 210 can be a "set top box" which can be used, for example, to provide interactive television functions to users, or a "network-" or "internet-computer" which allows users to interact with a local or global network using standard connections and protocols such as used for the Internet and World Wide Web. The computer 210 may include a host microprocessor, random access memory (RAM), read only memory (ROM), input/output (I/O) circuitry, and/or other components of computers well-known to those skilled in the art. Computer 210 may implement an application program with which a user is interacting via peripherals, such as mouse 200. For example, the application program can be a simulation program, such as a medical procedure simulation program. Alternatively, the application program may be a computer aided design or other graphic design program, an operating system, a video game, a word processor or spreadsheet, a Web page or browser that implements, for example, HTML or VRML instructions, a scientific analysis program, or other application program that may or may not utilize haptic feedback. Herein, for simplicity, operating systems such as Windows™, MS-DOS, MacOS, Linux, Be, etc. are also referred to as "application programs." The application program may comprise an interactive graphical environment, such as a graphical user interface (GUI) to allow the user to input information to the program. Typically, the application provides images to be displayed on a display 220 and/or outputs other feedback, such as auditory signals. The computer 210 is capable of generating a graphical environment 110, which can be a graphical user interface, game, simulation, such as those described above, or other visual environment. The computer displays graphical objects, such as graphical representations and graphical images, or "computer objects," which are not physical objects, but are logical software unit collections of data and/or procedures that may be displayed as images by computer 210 on display screen 220, as is well known to those skilled in the art. The application program checks for input signals received from the electronics and sensors of mouse 200, and outputs force values and/or commands to be converted into haptic output for mouse 200. Suitable software drivers which interface such simulation software with computer input/output (I/O) devices are available from immersion Corporation of San Jose, Calif. Display screen 220 can be included in the computer 210 and can be a standard display screen (LCD, CRT, flat panel, etc.), 3-D goggles, or any other visual output device. Typically, the host application provides images to be displayed on display device 220 and/or other feedback, such as auditory signals.

In the version of FIG. 5, the mouse 200 rests on a ground surface 205 such as a tabletop, mousepad, or a platform. A user grasps the mouse 200 and moves the mouse 200 in a planar workspace on the surface 205 as indicated by arrows 230. Mouse 200 may be moved relative to the ground surface 205, and in one version may be picked up and placed in a different location. In another version, the mouse 200 is linked to the ground surface 205. A frictional ball and roller assembly (not shown) can in some embodiments be provided on the underside of the mouse 200 to translate the planar motion of the mouse 200 into electrical position signals, which are sent to the computer 210 over a bus 235 as is well known to those skilled in the art. In other embodiments, different mechanisms and/or electronics can be used to convert mouse motion to position or motion signals received by the computer 210, as described below. Mouse 200 may be a relative device, in which its sensor detect a change in position of the mouse, allowing the mouse 200 to be moved over any surface at any location. Alternatively, an absolute mouse may also be used, in which the absolute position of the mouse 200 is known with reference to a particular predefined workspace. The bus 235, which communicates signals between mouse 200 and computer 210 may also provide power to the mouse 200. Components such as actuator 135 may require power that can be supplied from a conventional serial port or through an interface such as a USB or Firewire bus. In other embodiments, signals can be sent between mouse 200 and computer 210 by wireless transmission/reception. In some embodiments, the power for the actuator can be supplemented or solely supplied by a power storage device provided on the mouse 200, such as a capacitor or one or more batteries. Some embodiments of such are disclosed in U.S. Pat. No. 5,691,898, which is incorporated herein by reference in its entirety.

Mouse 200 may include or be acted on by an actuator 135 which is operative to produce forces on the mouse 200 and thereby provide haptic sensations to the user. The mouse 200 may be either a tactile mouse or a kinesthetic force feedback mouse, or both. In one version a tactile mouse comprises, for example, an actuator 135 positioned within the mouse 200 and outputs a force to the housing 215 of the mouse 200. This version is particularly useful in providing tactile sensations, such as vibrations, to the user. In one version, the actuator 135 comprises a grounded link that is connected to the mouse 200 to provide kinesthetic force feedback to the mouse 200 in two or more degrees of freedom, for example by forcing the mouse 200 in the direction of arrows 230. This version is particularly useful in kinesthetically simulating contours and the feel of objects. Each of these versions will be described herein below.

Figure 6:
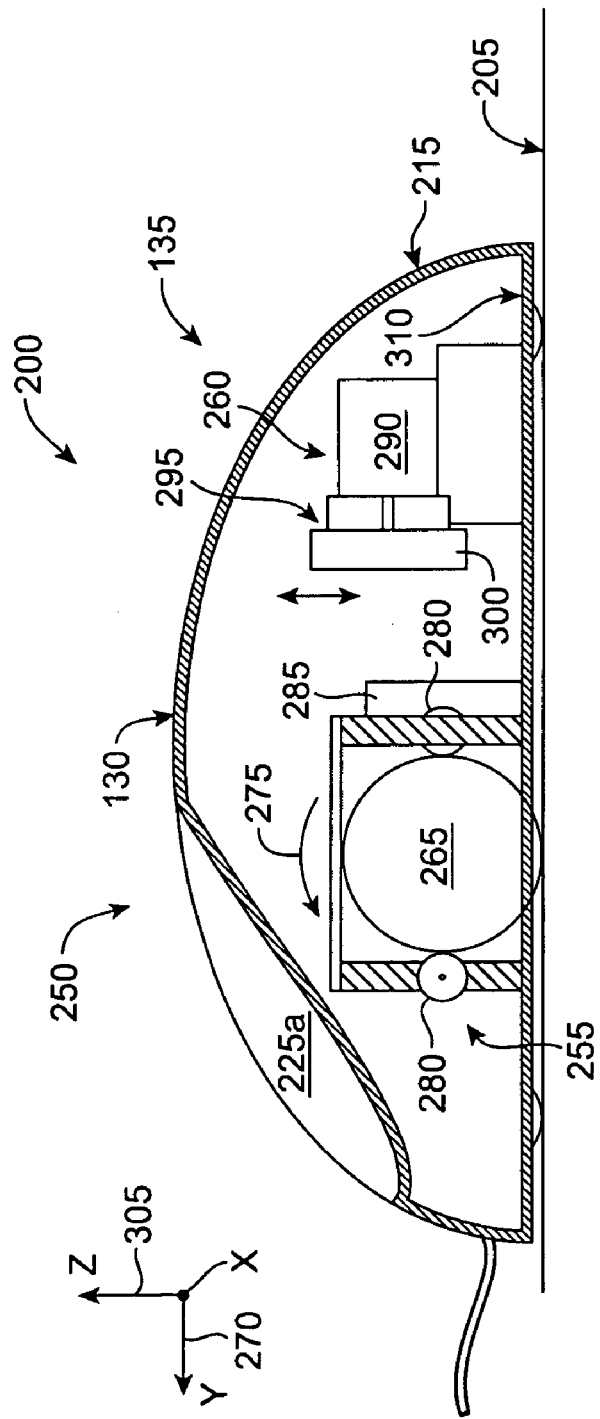
FIG. 6 is a schematic side view of an embodiment of a tactile mouse that may be used as a haptic interface in a simulation system according to the present invention.

FIG. 6 is a side cross-sectional view of a version of the mouse 200 of FIG. 5 where the mouse is a tactile mouse 250. Tactile mouse 250 includes one or more actuators 135 for imparting haptic feedback such as tactile sensations to the user of the tactile mouse 250. The actuator 135 outputs forces on the tactile mouse 250 which the user is able to feel. The embodiment of FIG. 6 is intended to provide inertial forces rather than contact forces; contact forces are described with respect to FIG. 7. In some embodiments, two or more actuators 135 can provide inertial forces or contact forces, or one actuator 135 can provide inertial forces, while a different actuator 135 can provide contact forces.

Tactile mouse 250 includes a housing 215, a sensing system 255, and a tactile actuator assembly 260. Housing 215 is shaped to fit the user's hand like a standard mouse while the user moves the tactile mouse 250 in the planar degrees of freedom and manipulates the buttons 225a, 225b. Other housing shapes can be provided in many different embodiments.

Sensing system 255 detects the position of the tactile mouse 250 in its planar degrees of freedom, e.g. along the X and Y axes. In the described embodiment, sensing system 255 includes any one of known sensing technologies. For example, in the version shown, a standard mouse ball 265 for providing directional input to the computer 210. Ball 265 is a sphere that extends partially out the bottom surface of the tactile mouse 250 and rolls in a direction corresponding to the motion of the tactile mouse 250 on a planar surface 205. For example, when the tactile mouse 250 is moved in a direction indicated by arrow 270 (y direction), the ball rotates in place in a direction shown by arrow 275. The ball motion can be tracked by a cylindrical roller 280, or the like, which is coupled to a sensor 285 for detecting the motion of the mouse. A similar roller and sensor can be used for the x-direction which is perpendicular to the y-axis. Other types of mechanisms and/or electronics for detecting planar motion of the tactile mouse 250 can be used in other embodiments. In some embodiments, high frequency tactile sensations can be applied by the actuator that cause a mouse ball 265 to slip with respect to the frictionally engaged rollers. In another version, an optical sensor that has no moving mouse ball component may be used. A suitable optical mouse technology is made by Agilent of Palo Alto, Calif. and can be advantageously combined with the tactile sensation technologies described herein, where the optical sensor detects motion of the mouse relative to the planar support surface by optically taking and storing a number of images of the surface and comparing those images over time to determine if the mouse has moved. For example, the IFeel™ mouse device from Logitech Corporation uses this type of sensor.

Buttons 225a, 225b can be selected by the user as a "command gesture" when the user wishes to input a command signal to the computer 210. The user pushes a button 225a, 225b down (in the degree of freedom of the button approximately along axis z) to provide a command to the computer 210. The command signal, when received by the computer 210, can manipulate the graphical environment in a variety of ways. In one embodiment, an electrical lead can be made to contact a sensing lead as with any mechanical switch to determine a simple on or off state of the button. An optical switch or other type of digital sensor can alternatively be provided to detect a button press. In a different continuous-range button embodiment, a sensor can be used to detect the precise position of one or more of the buttons 225a, 225b in its range of motion (degree of freedom). In some embodiments, one or more of the buttons 225a, 225b can be provided with force feedback (instead of or in addition to the tactile feedback from actuator 135), as described in copending U.S. patent application Ser. No. 09/235,132, filed on Feb. 18, 1999 and which is incorporated herein by reference in its entirety.

The tactile actuator assembly 260 may include an actuator assembly 54, and the actuator assembly includes an actuating mechanism 290, such as a motor, a flexure mechanism ("flexure") 295, and an inertial mass 300 coupled to the actuating mechanism 290 by the flexure 295. The inertial mass 300 is moved in a linear direction by the actuating mechanism 290, for example approximately in the z-axis 305 which is approximately perpendicular the planar workspace of the mouse 200 in the x- and y-axes, e.g. the mouse's position or motion is sensed in the x-y plane. The tactile actuator 260 is coupled to the housing 215 of the tactile mouse 250 such that inertial forces caused by the motion of the inertial mass 300 are applied to the housing 215 of the tactile mouse 250 with respect to the inertial mass, thereby conveying haptic feedback such as tactile sensations to the user of the tactile mouse 250 who is contacting the housing 215. Thus, the actuating mechanism 290 need not directly output forces to the user or to a user-manipulatable object, but instead the moving mass creates an inertial force that is indirectly transmitted to the user. Thus, the inertial mass is used as a grounding reference for tactile sensations. Alternatively, the actuating mechanism 290 may directly apply the forces or may be coupled to a rotating eccentric mass.

The version shown in FIG. 6 provides inertial forces that are directed substantially in a single particular degree of freedom, i.e. along a particular axis. In most embodiments, crisp haptic sensations cannot typically be achieved using a continuously rotating eccentric mass, which provides an undirected inertial force in a rotating plane and creates a generalized wobble on the device. Therefore, a linear inertial force is desirable. It is important to consider the direction or degree of freedom that the linear force is applied on the housing of the mouse device with respect to the inertial mass. If a significant component of the force is applied along one or more of the moveable planar degrees of freedom of the mouse (i.e., the x or y axis) with respect to the inertial mass, the short pulse can jar the mouse in one or both of those planar degrees of freedom and thereby impair the user's ability to accurately guide a controlled graphical object, such as a cursor, to a given target. Since a primary function of a mouse is accurate targeting, a tactile sensation that distorts or impairs targeting, even mildly, is usually undesirable. To solve this problem, the mouse device of the present invention applies inertial forces substantially along the z axis, orthogonal to the planar x and y axes of the mouse controller. In such a novel configuration, tactile sensations can be applied at a perceptually strong level for the user without impairing the ability to accurately position a user controlled graphical object in the x and y axes. Furthermore, since the tactile sensations are directed in a third degree of freedom relative to the two-dimensional mouse planar workspace and display screen, jolts or pulses output along the z axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border.

One version of the tactile mouse 250 provides linear output forces using a rotary actuator, i.e. an actuator outputting a rotary force (torque). In the current actuator market, rotary actuators such as rotary DC motors are among the most inexpensive types of actuators that still allow high bandwidth operation (when driven with signals through, for example, an H-bridge type amplifier). These types of motors can also be made very small and output high magnitude forces for their size. Thus, actuating mechanism 290 may be a DC motor, but can be other types of rotary actuators in other embodiments. For example, a moving magnet actuator can be used instead of a DC motor; such an actuator is described in detail in copending patent application Ser. No. 60/133,208, incorporated herein by reference. Other types of actuators can also be used, such as a stepper motor controlled with pulse width modulation of an applied voltage, a pneumatic/hydraulic actuator, a torquer (motor with limited angular range), shape memory alloy material (wire, plate, etc.), a piezo-electric actuator, etc. The tactile mouse 250 in the version shown in FIG. 6 makes use of low cost flexure as a mechanical transmission to convert a rotary actuator force to a linear force that is used to move the inertial mass, and to also amplify the forces to allow more compelling haptic sensations. Versions of the flexure are described in U.S. patent application Ser. No. 09/585,741. In the described embodiment of FIG. 6, tactile actuator 260 has a stationary portion which is coupled to a part of the housing 215 (and thus stationary only with respect to the portion of the mouse housing to which it is coupled), for example by being coupled to bottom portion 310 of the housing 215. A rotating shaft of the actuating mechanism 290 is coupled to the moving portion of the assembly that includes the inertial mass 300 and at least part of the flexure 295, where the inertial mass moves linearly approximately along the Z-axis. The actuating mechanism 290 is operative to oscillate the inertial mass 300 (or itself in some embodiments) quickly along an axis which is approximately parallel to the Z axis. Thus, forces produced by the oscillation of the inertial mass 300 are transmitted to the housing 215 through the tactile actuator 260 and felt by the user.

Alternatively, directed inertial forces can be output along the X and Y axes in the planar workspace of the device and can be compensated for to prevent or reduce interference with the user's control of the device. One method to compensate is to actively filter imparted jitter in that workspace, as disclosed in U.S. Pat. No. 6,020,876 which is incorporated herein by reference in its entirety. The x and y directed tactile sensations may also provide advantageous and authentic palpation related tactile sensations.

One way to direct an inertial force is to directly output a linear force, e.g., a linear moving voice coil actuator or a linear moving-magnet actuator can be used, which are suitable for high bandwidth actuation. These embodiments are described in greater detail in U.S. Pat. No. 6,211,861 which is incorporated herein by reference in its entirety. These embodiments allow for high fidelity control of force sensations in both the frequency and magnitude domains, and also allow the forces to be directed along a desired axis and allows for crisp tactile sensations that can be independently modulated in magnitude and frequency.

Figure 7:
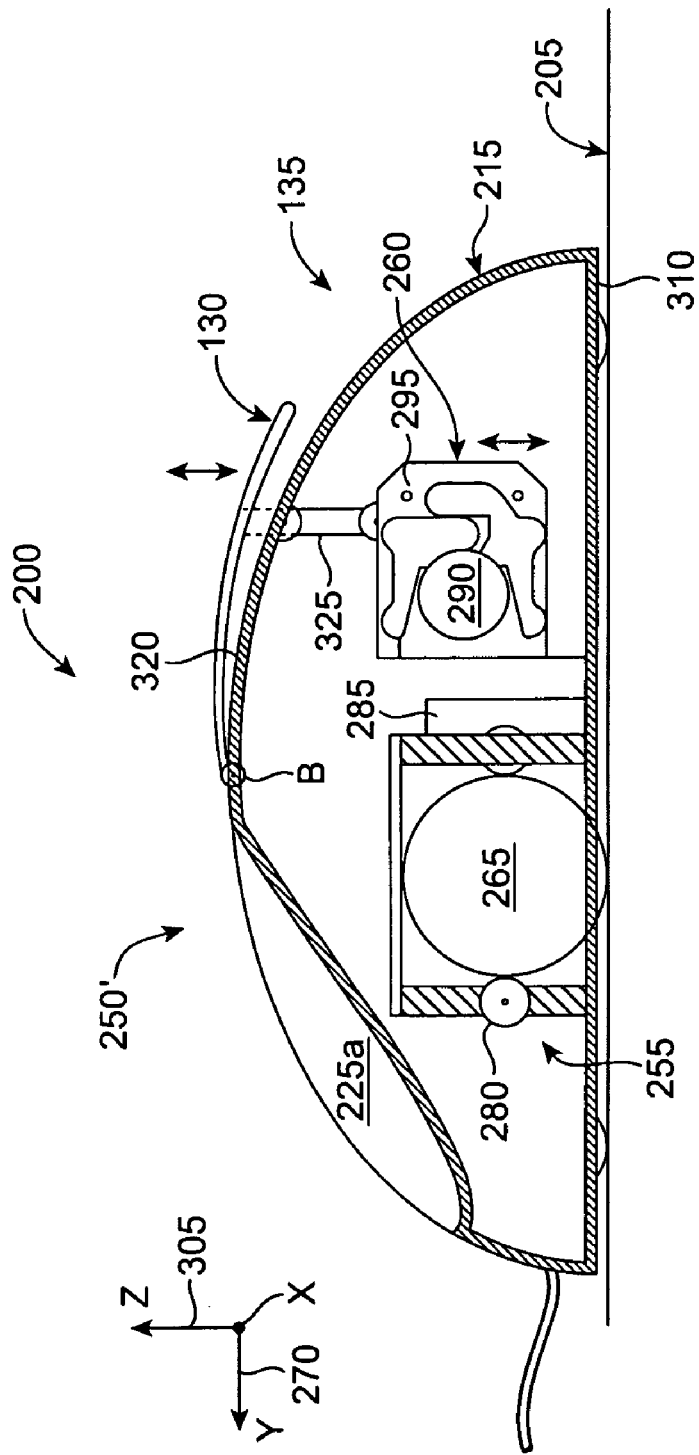
FIG. 7 is a schematic side view of another embodiment of a tactile mouse that may be used as a haptic interface in a simulation system according to the present invention.

FIG. 7 is a side elevational view of another version of a tactile mouse 250'. In this version, the linear motion provided by the tactile actuator 260 is used to drive a portion of the housing 215 (or other member) that is in direct contact with the user's hand (finger, palm, etc.). The tactile actuator 260 of this version includes an actuating mechanism 290, flexure 295, and inertial mass similar to the version of FIG. 6 (except that the actuating mechanism and flexure of FIG. 7 are shown rotated approximately 90 degrees with respect to FIG. 6). The tactile mouse 250' of FIG. 7 includes a moving cover portion 320 which can be part of the housing 215. Cover portion 320 is coupled to the rest of the housing 215 by a hinge allowing their respective motion, such as a mechanical hinge, a flexure, rubber bellows, or other type of hinge. Cover portion 320 may thus rotate about an axis B of the hinge. In other embodiments, the hinge can allow linear or sliding motion rather than rotary motion between cover and housing portions. In the embodiment shown, the cover portion 320 extends in the y-direction from about the mid-point of the mouse housing to near the back end of the tactile mouse 250'. In other embodiments, the cover portion 320 can cover larger or smaller areas. Various embodiments of such a moveable cover portion are described in copending patent application Ser. No. 09/253,132. The cover portion 320 is rotatably coupled to a link 325, and the link 325 is rotatably coupled at its other end to the linear moving portion the flexure 295. Thus, as the member of the flexure 295 is moved along the z-axis, this motion is transmitted to the cover portion 320 through the link 325, where the rotational couplings of the link allow the cover portion 320 to move about axis B of the hinge. The actuating mechanism 290 can drive the flexure 295 up on the z-axis, which causes the cover portion 320 to move up to, for example, the dashed position shown.

The user feels the force of the cover portion 320 against his or her hand (such as the palm) as a contact force (as opposed to an inertial force). When the cover portion is oscillated, the user can feel a vibration-like force. The cover portion can also be used to designate 3-D elevations in a graphical environment. In some embodiments, the configuration described can inherently provide an inertial force as well as the contact force if an inertial mass is moved as described above in addition to the contact portion. In other embodiments, a different "contact member" (e.g. a member that is physically contacted by the user) can be moved instead of the cover portion 320 but in a similar fashion, such as mouse buttons 225a, 225b or other buttons, tabs, mouse wheels, or dials. Furthermore, in some embodiments multiple actuator assemblies can be used to drive a cover portion and one or more buttons or other controls of the tactile mouse 250'. Furthermore, in some embodiments, one actuator assembly can be used to move a cover portion 320 or other member, and a different actuator assembly can be used to provide an inertial force as in the embodiment of FIG. 6, where the inertial and contact forces can operate in conjunction if desired.

Figure 8:
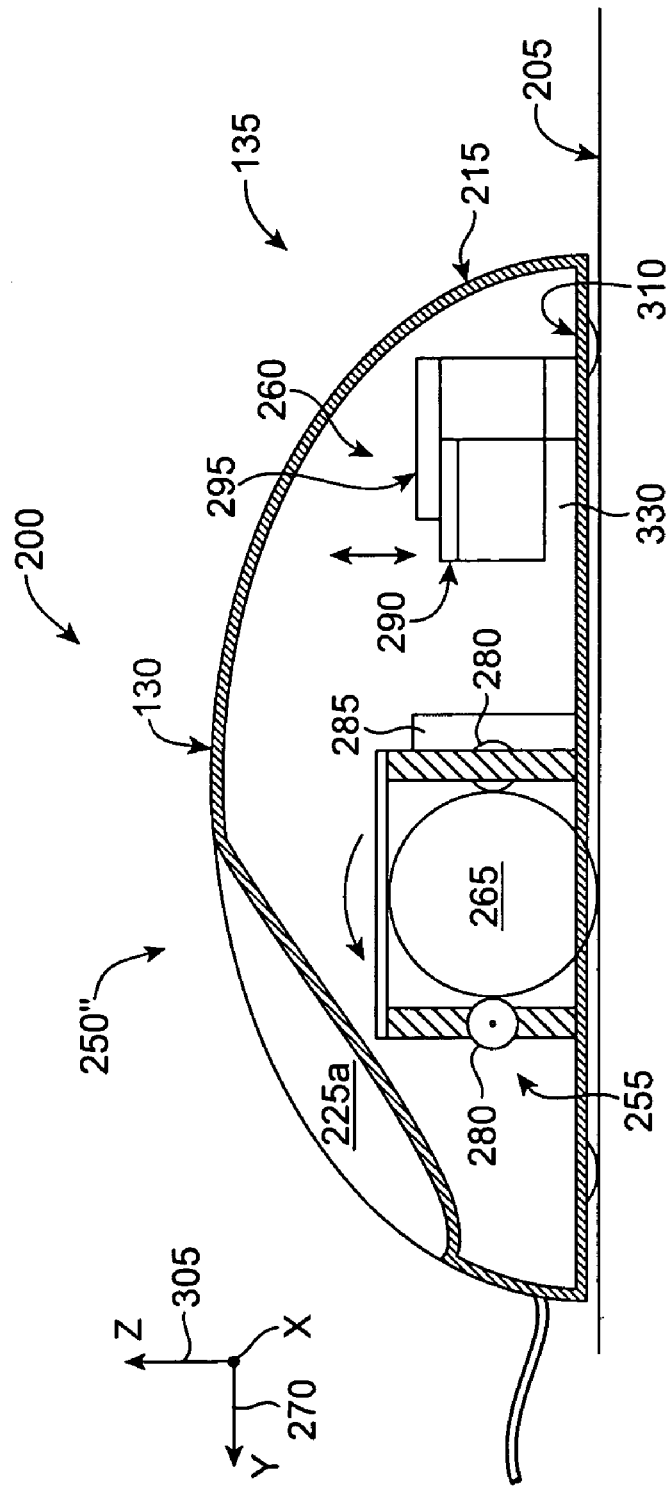
FIG. 8 is a schematic side view of another embodiment of a tactile mouse that may be used as a haptic interface in a simulation system according to the present invention.

FIG. 8 is a side elevational view of another version of a tactile mouse 250" including another embodiment of the tactile actuator 260 of the present invention. In this version, the actuating mechanism also acts as the inertial mass or moving element. As shown in FIG. 8, the tactile actuator 260 can be positioned on the bottom portion 310 of the mouse housing 215, where space 330 is allowed for the tactile actuator 290 to move along the z-axis without impacting the housing 215 as described in U.S. patent application Ser. No. 09/585,741. In other embodiments, the tactile actuator 260 can be positioned on other surfaces in the housing, such as the top or sides.

Providing the actuating mechanism 290 as the inertial mass that is driven in the z-axis has several advantages. For example, this embodiment saves the cost of providing a separate inertial mass and saves space and total weight in the device. Another advantage of this version is that it has a very low profile in the z-axis dimension. This is allowed by the orientation of the actuating mechanism 290 in the x-y plane, e.g. the axis of rotation of the actuator shaft is parallel to the z-axis.

Figure 9:
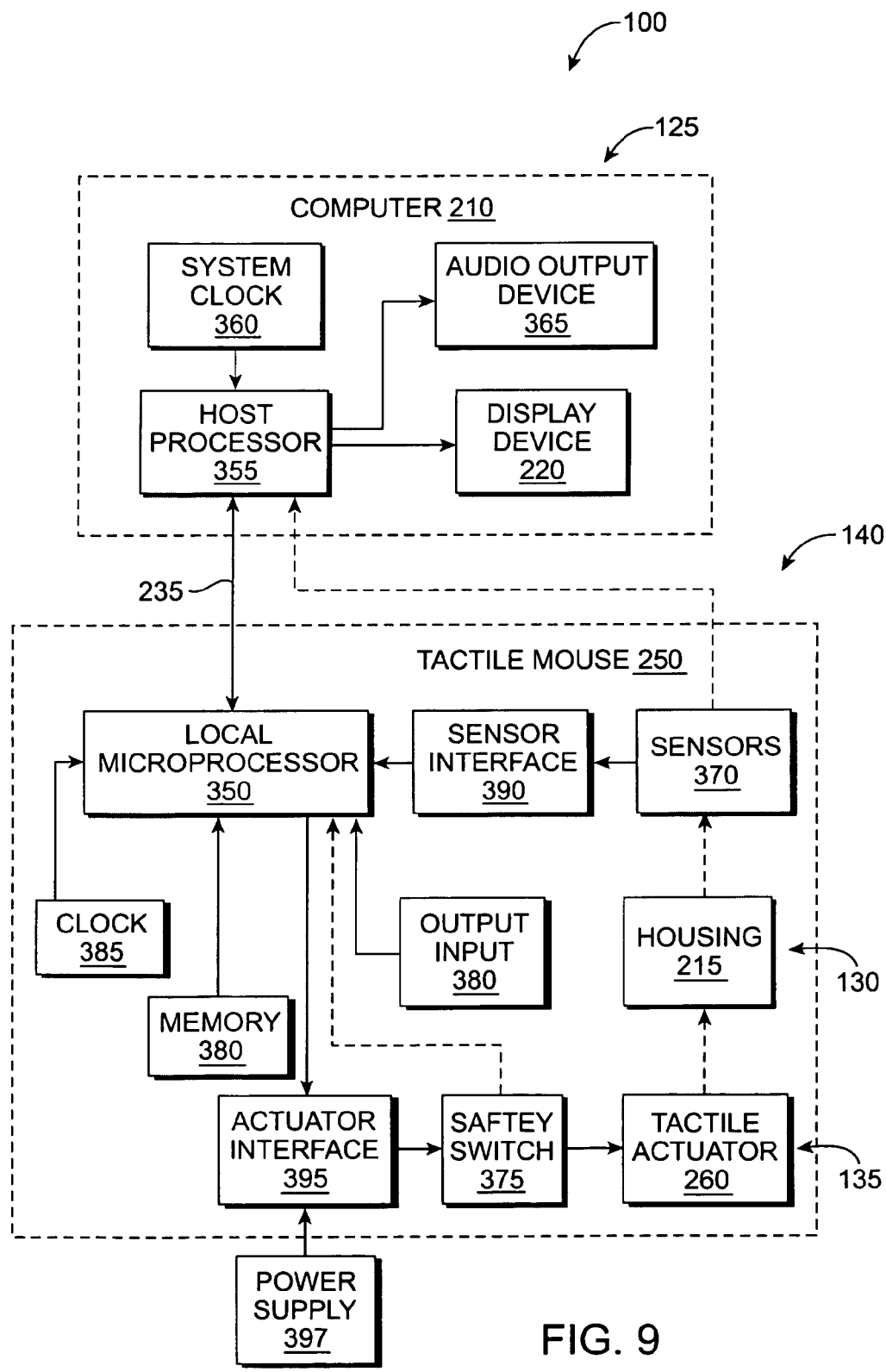
FIG. 9 is a block diagram schematically illustrating a version of a simulation system with a tactile mouse.

FIG. 9 is a block diagram illustrating one embodiment of the simulation system 100 where the controller 125 may comprise a computer 210 and the haptic interface device 140 may comprise a tactile mouse 250, such as one of the tactile mice discussed above. In this version, the tactile mouse 250 comprises a local microprocessor 350. However, the invention may be implemented with higher level control.

The computer 210 may include a processor 355, such as a microprocessor, a clock 360, a display screen 220, and an audio output device 365. The computer 210 may also include other well known components, such as random access memory (RAM), read-only memory (ROM), and input/output (I/O) electronics (not shown). Display screen 220 displays images of a simulation, game environment, operating system application, etc. Audio output device 365, such as speakers, is preferably coupled to host microprocessor 355 via amplifiers, filters, and other circuitry well known to those skilled in the art and provides sound output to user when an "audio event" occurs during the implementation of an application program. Other types of peripherals can also be coupled to host processor 355, such as storage devices (hard disk drive, CD ROM drive, floppy disk drive, etc.), printers, and other input and output devices.

The haptic interface device 140, such as a tactile mouse 250, is coupled to the computer 210 by a bi-directional bus 235. The bi-directional bus 235 sends signals in either direction between the computer 210 and the interface device 140. Bus 235 can be a serial interface bus, such as an RS232 serial interface, RS-422, Universal Serial Bus (USB), MIDI, or other protocols well known to those skilled in the art, or a parallel bus or wireless link. For example, the USB standard provides a relatively high speed interface that can also provide power to the actuator 135.

The haptic interface device 140, such as the tactile mouse 250 can include a local controller, such as a local microprocessor 350. Local microprocessor 350 can optionally be included within the housing 215 of the tactile mouse 250 to allow efficient communication with other components of the tactile mouse 250. By local it is meant that the processor 350 is a separate processor from any processors in the computer 210. The local microprocessor 350 may be dedicated to haptic feedback and sensor I/O of the tactile mouse 250. Local microprocessor 350 can be provided with software instructions to wait for commands or requests from the computer 210, decode the command or request, and handle/control input and output signals according to the command or request. In addition, local processor 350 can operate independently of the computer 210 by reading sensor signals and calculating appropriate forces from those sensor signals, time signals, and stored or relayed instructions selected in accordance with a host command. Suitable microprocessors for use as local microprocessor 350 include the MC68HC711E9 by Motorola, the PIC16C74 by Microchip, and the 82930AX by Intel Corp., for example, as well as more sophisticated force feedback processors such as the Immersion Touchsense Processor, available from Immersion Corporation in San Jose, Calif. Local microprocessor 350 can include one microprocessor chip, multiple processors and/or co-processor chips, and/or digital signal processor (DSP) capability.

Local microprocessor 350 can receive signals from sensor(s) 370 and provide signals to tactile actuator 260 in accordance with instructions provided by the computer 210 over bus 235. For example, in a local control embodiment, the computer 210 provides high level supervisory commands to local microprocessor 350 over bus 235, and local microprocessor 350 decodes the commands and manages low level force control loops to sensors 370 and the tactile actuator 260 in accordance with the high level commands and independently of the computer 210. This operation is described in greater detail in U.S. Pat. Nos. 5,739,811 and 5,734,373, both incorporated by reference herein in their entireties. In the computer control loop, force commands are output from the computer 210 to local microprocessor 350 and instruct the local microprocessor 210 to output a force or force sensation having specified characteristics. The local microprocessor 350 reports data to the computer 210, such as locative data that describes the position of the tactile mouse 250 in one or more provided degrees of freedom. The data can also describe the states of buttons 225a, 225b and a safety switch 375. The computer 210 uses the data to update executed programs. In the local control loop, actuator signals are provided from the microprocessor 350 to tactile actuator 260 and sensor signals are provided from the sensor 370 and other input devices 380 to the local microprocessor 350. Herein, the term "haptic sensation" or "tactile sensation" refers to either a single force or a sequence of forces output by the tactile actuator 260 which provide a sensation to the user. For example, vibrations, a single jolt or pulse, or a texture sensation are all considered haptic or tactile sensations. The local microprocessor 350 can process inputted sensor signals to determine appropriate output actuator signals by following stored instructions. The microprocessor 350 may use sensor signals in the local determination of forces to be output on the housing 215, as well as reporting locative data derived from the sensor signals to the host computer.

In yet other embodiments, other simpler hardware can be provided locally to tactile mouse 250 to provide functionality similar to microprocessor 350. For example, a hardware state machine incorporating fixed logic can be used to provide signals to the tactile actuator 260 and receive sensor signals from sensors 370, and to output tactile signals according to a predefined sequence, algorithm, or process. Techniques for implementing logic with desired functions in hardware are well known to those skilled in the art.

In a different, host-controlled embodiment, the computer 210 can provide low-level force commands over bus 235, which are directly transmitted to the tactile actuator 260 via local microprocessor 350 or other (e.g. simpler) circuitry. The computer 210 thus directly controls and processes all signals to and from the tactile mouse 250, e.g. the computer 210 directly controls the forces output by tactile actuator 260 and directly receives sensor signals from sensor 370 and input devices 380. This embodiment may be desirable to reduce the cost of the haptic feedback device yet further, since no local microprocessor 350 or other processing circuitry need be included in the tactile mouse 350.

In the simplest host control embodiment, the signal from the host to the device can be a single bit that indicates whether to actuate the actuator at a predefined frequency and magnitude. In a more complex embodiment, the signal from the host could include a magnitude, giving the strength of the desired actuation. In yet a more complex embodiment, the signal can include a direction, giving both a magnitude and a sense for the actuation. In still a more complex embodiment, a local processor can be used to receive a simple command from the host that indicates a desired force value to apply over time. The microprocessor then outputs the force value for the specified time period based on the one command, thereby reducing the communication load that must pass between host and device. In an even more complex embodiment, a high-level command with tactile sensation parameters can be passed to the local processor 350 on the device which can then apply the full sensation independent of host intervention. Such an embodiment allows for the greatest reduction of communication load. Alternatively, a combination of numerous methods described above can be used for a single tactile mouse 250.

Local memory 380, such as RAM and/or ROM, is preferably coupled to microprocessor 350 in tactile mouse 250 to store instructions for microprocessor 350 and store temporary and other data. For example, force profiles can be stored in memory 350, such as a sequence of stored force values that can be output by the microprocessor, or a look-up table of force values to be output based on the current position of the tactile mouse 250. In addition, a local clock 385 can be coupled to the microprocessor 350 to provide timing data, similar to the system clock of the computer 210; the timing data might be required, for example, to compute forces output by tactile actuator 260 (e.g., forces dependent on calculated velocities or other time dependent factors). In embodiments using the USB communication interface, timing data for microprocessor 350 can be alternatively retrieved from the USB signal. For example, the computer 210 can send a "spatial representation" to the local microprocessor 350, which is data describing the locations of some or all the graphical objects displayed in a GUI or other graphical environment which are associated with forces and the types/characteristics of these graphical objects. The microprocessor 350 can store such a spatial representation in local memory 380, and thus will be able to determine interactions between the user object and graphical objects (such as the rigid surface) independently of the computer 210. In addition, the microprocessor 350 can be provided with the necessary instructions or data to check sensor readings, determine cursor and target positions, and determine output forces independently of the computer 210. The computer 210 could implement program functions (such as displaying images) when appropriate, and synchronization commands can be communicated between the microprocessor and the computer 210 to correlate the microprocessor and host processes. Also, the local memory 380 can store predetermined force sensations for the microprocessor that are to be associated with particular types of graphical objects. Alternatively, the computer 210 can directly send force feedback signals to the tactile mouse 250 to generate tactile sensations.

Sensors 370 sense the position or motion of the mouse (e.g. the housing 215) in its planar degrees of freedom and provides signals to microprocessor 350 (or to computer 210) including information representative of the position or motion. Sensors suitable for detecting planar motion of a tactile mouse include the sensing system 255 described above for FIG. 6, e.g. digital optical encoders frictionally coupled to a rotating ball or cylinder, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 390 can be used to convert sensor signals to signals that can be interpreted by the microprocessor 350 and/or computer 210, as is well known to those skilled in the art.

Tactile actuator 260 transmits forces to the housing 215 of the tactile mouse 250 as described above with reference to FIGS. 6–8 in response to signals received from microprocessor 350 and/or computer 210. Tactile actuator 260 is provided to generate inertial forces by moving an inertial mass, and/or contact forces by moving a contact member such as a cover portion 320. The tactile actuator 260 has the ability to apply a short duration force on the housing 215 of the mouse with respect to an inertial mass. In one version, this short duration is directed substantially along a Z axis orthogonal to the X-Y plane of motion of the tactile mouse 250. The short duration force may be a single burst of fixed magnitude and duration or may be controllable and/or shapeable. In one version, a periodic force can be applied to the housing of the tactile mouse 250 with respect to the inertial mass, where the periodic force can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613 which is incorporated herein by reference in its entirety. There are two ways the period sensations can be communicated from the host to the device. The wave forms can be "streamed" as described in U.S. Pat. No. 5,959,613 and pending provisional patent application 60/160,401, both incorporated herein by reference in their entireties. Or the waveforms can be conveyed through high level commands that include parameters such as magnitude, frequency, and duration, as described in U.S. Pat. No. 5,734,373 which is incorporated herein by reference in its entirety. These control schemes can also apply when providing contact forces using a moveable member. A short duration force command signal can also be used in those embodiments outputting both inertial and contact forces to move both the inertial mass and the contact member to provide simultaneous pulse sensations; or, the inertial mass can be controlled to output one sensation and the contact member can be simultaneously controlled to output a different sensation, such as a force of a different duration or magnitude, a vibration of a different frequency, a texture of a different spacing, etc.

Alternate embodiments can employ additional actuators for providing haptic sensations in the z-direction and/or in the degrees of freedom of the tactile mouse 250. In one embodiment, the tactile mouse 250 can include multiple tactile actuators for greater magnitude forces, forces in multiple degrees of freedom, and/or different simultaneous haptic sensations. In another embodiment, the tactile mouse 250 can be enhanced with a secondary, different type of actuator in addition the actuator assembly described herein. Because of power constraints in some embodiments, this secondary actuator can be passive (i.e., it dissipates energy). The passive actuator can be a brake, e.g., a brake employing a very low power substrate such as a magneto-rheological fluid. Alternatively, it can be a more traditional magnetic brake. The passive braking means can be employed through a frictional coupling between the mouse housing 215 and the table surface 205. For example, a friction roller in the mouse housing base can engage the table surface. The roller can spin freely when the mouse is moved by the user so long as the passive brake is not engaged. When the brake is engaged, the user can feel the passive resistance to motion of the mouse (in one or two of the planar degrees of freedom of the mouse).

Actuator interface 395 can be optionally connected between tactile actuator 260 and local microprocessor 350 to convert signals from microprocessor 350 into signals appropriate to drive tactile actuator 260. Actuator interface 395 can include power amplifiers, switches, digital to analog controllers (DACs), analog to digital controllers (ADCs), and other components, as is well known to those skilled in the art. It should be noted that circuitry should be provided to allow the actuator to be driven in two directions, since the preferred embodiment does not allow full revolutions of the actuator shaft, as described above. Circuitry for such bi-directional (harmonic) operation are well known to those skilled in the art and are also described in copending provisional patent application No. 60/142,155, incorporated herein by reference in its entirety.

Other input devices 380 may be included in the tactile mouse 250 and send input signals to microprocessor 350 or to the computer 210 when manipulated by the user. Such input devices include buttons 225a, 225b and can include additional buttons, dials, switches, scroll wheels, or other controls or mechanisms.

Power supply 397 can optionally be included in tactile mouse 250 coupled to actuator interface 395 and/or tactile actuator 260 to provide electrical power to the actuator, or may be provided as a separate component. Alternatively, and more preferably when possible, power can be drawn from a power supply separate from the tactile mouse 250, or power can be received across a USB or other bus. Also, received power can be stored and regulated by tactile mouse 250 and thus used when needed to drive tactile actuator 260 or used in a supplementary fashion. Because of the limited power supply capabilities of USB, a power storage device may be required in the mouse device to ensure that peak forces can be applied (as described in U.S. Pat. No. 5,929,607, incorporated herein by reference in its entirety). For example, power can be stored over time in a capacitor or battery and then immediately dissipated to provide a jolt sensation to the mouse. Alternatively, this technology can be employed in a wireless mouse, in which case battery power is used to drive the tactile actuator 260. In one embodiment, the battery can be charged by an electric generator on board the mouse, the generator driven by the user's motions of the mouse device. For example, a mouse ball or cylinder can turn a frictional roller or shaft that is coupled to and recharges the generator.

A safety switch 375 can optionally be included to allow a user to deactivate tactile actuator 260 for safety reasons. For example, the user must continually activate or close safety switch 375 during operation of tactile mouse 250 to enable the tactile actuator 250. If, at any time, the safety switch is deactivated (opened), power from power supply 397 is cut to tactile actuator 260 (or the actuator is otherwise disabled) as long as the safety switch is needed. Embodiments include an optical switch, an electrostatic contact switch, a button or trigger, a hand weight safety switch, etc.

A basic tactile functionality desired for the tactile mouse 250 is a jolt sensation. A jolt sensation may be output when the cursor 115 is moved to a position where it intersects the graphical representaion 120 or moved to a position where is lies within or near a predetermined region of the graphical representation 120. The appropriate sensation for this simple cursor interaction is a quick, abrupt pop. This can be achieved by applying a crisp, short force between the inertial mass and the housing of the mouse device, e.g. by moving the inertial mass in one or a small number of oscillations. For example, a jolt can include a single impulse of force that quickly rises to a desired magnitude and then is turned off or quickly decays back to zero or small magnitude. The pulse can also or alternatively be output as a motion up and down of a contact member such as a cover portion of the housing of the mouse, in appropriate embodiments.

A vibration can also be output, which can include a series of jolts or pops applied periodically over a particular time period at a particular frequency. The time-varying force can be output according to a force vs. time waveform that is shaped like a sine wave, triangle wave, sawtooth wave, or other shape of wave. The vibration is caused by a mass or contact member oscillating back and forth.

In some embodiments, the sensation of a "spatial texture" may be output by correlating jolts and/or vibrations with the motion of the cursor over a graphical object or area. This type of force can depend on the position of the tactile mouse 215 in its planar workspace (or on the position of the cursor 115 in the graphical environment 110). For example, the cursor 115 can be dragged over a graphical grating and jolts can be correlated with the spacing of the grating openings. Thus, texture bumps are output depending on whether the cursor 115 has moved over the location of a bump in a graphical object; when the mouse is positioned between "bumps" of the texture, no force is output, and when the mouse moves over a bump, a force is output. This can be achieved by host control (e.g., the host computer 210 sends the jolts as the cursor 115 is dragged over the grating) or by local control (e.g., the host computer 210 sends a high level command with texture parameters and the sensation is directly controlled by the tactile mouse 250 device). Some methods for providing texture sensations in a tactile sensation device are described in copending application Ser. No. 09/504,201, filed Feb. 15, 2000 and incorporated herein by reference in its entirety. In other cases, a texture can be performed by presenting a vibration to a user, the vibration being dependent upon the current velocity of the tactile mouse 250 in its planar workspace 205. When the tactile mouse 250 is stationary, the vibration is deactivated; as the mouse moves faster, the frequency and magnitude of the vibration is increased. This sensation can be controlled locally by the device processor 350, or be controlled by the computer 210. Local control by the device may eliminate communication burden in some embodiments. Other spatial force sensations besides textures can also be output. In addition, any of the described haptic sensations herein can be output by tactile actuator 260 simultaneously or otherwise combined as desired.

The computer 210 can coordinate haptic sensations with interactions or events occurring within the application program. For example, the tactile mouse 250 may be used as the haptic interface 140 in the simulation system 100 to provide authentic tactile sensations to the user during, in particular, a medical simulation that relates to palpation. The tactile mouse 250 of the present invention can provide tactile sensations that make interaction with the graphical representation 120 more compelling and more intuitive. The user typically controls a cursor 115 to interact with the graphical representation 120. The cursor 115 may be moved according to a position control paradigm, where the position of the cursor 115 corresponds to a position of the tactile mouse 250 in its planar workspace 205. Tactile sensations associated with the interaction of the cursor 115 and the graphical representation 120 can be output using the tactile actuator 260, for example, based on signals output from the local microprocessor 350 or the computer 210.

The simulation system 100 can be designed to provide specific tactile sensations to the user when the simulation system 100 comprises a palpation trainer, such as the palpation trainers discussed above. As a tactile mouse 250 is used to control a cursor 115 in a graphical environment 110 that includes a graphical representation 120 of at least a portion of a living body, such as the graphical environments shown in FIGS. 1, 2A–2D, 3 and 4, tactile sensations may be output to the housing 215, and thus to the user. In a relatively simple version, a jolt or pop, or other sensation, may be output whenever the cursor 115 intersects the boundary of the graphical representation 120. This version is advantageous in the ease with which it is implementable. This version is advantageous over non-haptic versions in that the user receives tactile input and thus involves more senses in the learning process. In addition, it has been discovered that even simple haptic signals when combined with visual feedback can create a realistic simulation. Thus, when a user views the cursor 115 intersecting the boundary of the graphical representation 120 at the same time that the user feels a tactile sensation, the user believes that the graphical representation has been touched. This effect is even more compelling when the mapping of the cursor 115 is broken so that the cursor 115 appears to rest against the boundary of the graphical representation 120 even though the user object 130 has continued to be moved, as described in U.S. Pat. No. 6,028,593 which is incorporated herein by reference in its entirety.

A haptic sensation may also be output to the user when the cursor 115 is located within or near a predetermined location on the graphical representation 120. For example, in the version shown in FIG. 2A, a jolt or pop may be output to the user when the cursor 115 is within the first region 150 to indicate to the user that the correct location has been found. In a specific version, the first region 150 may relate to the position of the liver for a graphical environment 110 such as the one shown in FIG. 4. When the user correctly positions the cursor 115, a haptic sensation is output to indicate that the liver has been located. In the version of FIG. 2D, the haptic sensation may also be output when the cursor 115 is within the second region 165. In one version, a first haptic sensation, such as a jolt of a first magnitude, is output when the cursor 115 intersects the graphical representation 120 and a second haptic sensation, such as a second jolt of a different magnitude than the first jolt, is output when the cursor is within the first region 150. Different haptic sensations may be output for each of the different areas of regions of interest in the graphical representation 120.

Vibratory haptic sensations may be output to the user of the simulation system 100. For example, the tactile mouse 250 may be used to simulate the pulse of a living body. In this version, a haptic sensation comprising a low frequency vibration provides a particularly authentic simulation of the pulse. The time-varying force can be output according to a force vs. time waveform that is shaped like a sine wave and may have a frequency of from about 0.5 Hz to about 3 Hz, depending on the pulse rate that is to be simulated. Vibratory haptic sensations are useful in simulating other experiences taught by the palpation trainer. For example, chest vibrations during talking and breathing, percussion tympani and dullness, and vascular thrill may be simulated by properly adjusting the frequency and magnitude of the vibratory haptic sensation. The vibrations to be output may be determined by performing a vibration analysis on actual patients and using the result to design the output vibrations and/or by having trained medical practitioners evaluate or design the sensations.

The shape of the vibratory waveform may also be selected to provide a predetermined haptic sensation to the user. For example, a sinusoidal waveform may be selected to simulate a healthy pulse. Alternatively, the shape may be other than sinusoidal to indicate an abnormal pulse. To design a complex waveform, the pulse waveform of a diseased patient may be collected and analyzed, for example by performing a Fourier analysis on the signal. The resulting analysis may then be used to create the simulated waveform that is to be output by the simulation system 100. In addition, a display of the waveform, in the time and/or the frequency domains may also be provided.

Texture haptic sensations may also be designed into the simulation system 100. The texture of the skin may be simulated to give the user the sensation of being in contact with the skin. In addition, pops, jolts or vibrations may be added to simulate scars or other features on the surface of the skin. The texture of an internal organ may also be simulated.

Additional haptic sensations that may be provided by the tactile mouse 250 are described in U.S. patent application Ser. No. 60/224,584, filed on Aug. 11, 2000 and in U.S. patent application Ser. No. 60/236,417, filed on Sep. 28, 2000.

In another version of the invention the simulation system 100 may comprise a haptic interface 140 comprising a version of a mouse 200 that has kinesthetic force feedback capabilities. FIG. 10 shows a kinesthetic force feedback mouse 400 to which one or more grounded forces may be applied, for example by being applied in the lateral or the x and y directions.

FIG. 10 is a perspective view of a kinesthetic force feedback mouse 400 (hereinafter force feedback mouse 400) as part of a haptic electronic interface 410 according to an embodiment of the present invention. The force feedback mouse 400 in this version is movable in relation to another portion of the interface device 140.

Force feedback mouse 400 is an object that is preferably grasped or gripped and manipulated by a user. By "grasp," it is meant that users may releasably engage a portion of the object in some fashion, such as by hand, with their fingertips, etc. For example, images are displayed and/or modified on the display screen 220 of the computer 210 in response to such manipulations. In the described embodiment, force feedback mouse 400 is shaped so that a user's fingers or hand may comfortably grasp the object and move it in the provided degrees of freedom in physical space. For example, a user can move force feedback mouse 400 to correspondingly move a computer generated graphical object, such as a cursor or other image, in a graphical environment provided by the computer 210. The available degrees of freedom in which force feedback mouse 400 can be moved are determined from the haptic interface 210, described below. In addition, force feedback mouse 400 may include one or more buttons 405 to allow the user to provide additional commands to the computer system. The force feedback mouse 400 may also include additional buttons. For example, a thumb button (not shown) may be provided. The buttons allow a user to input a command independently of the position of the force feedback mouse 400 in the provided degrees of freedom, as discussed above. For example, in a GUI, buttons are commonly used to select options once a cursor has been guided to a desired area or object on the screen using the position of the mouse.

Electronic interface 410 interfaces mechanical and electrical input and output between the force feedback mouse 400 and the computer 210 implementing the application program, such as the simulation, a GUI, or game environment. Electronic interface 410 provides multiple degrees of freedom to force feedback mouse 400; in the preferred embodiment, two linear, planar degrees of freedom are provided to the mouse, as shown by arrows 230. In other embodiments, greater or fewer degrees of freedom can be provided, as well as rotary degrees of freedom.

In one version, the user manipulates force feedback mouse 400 in a planar workspace, much like a traditional mouse, and the position of force feedback mouse 400 is translated into a form suitable for interpretation by position sensors of the electronic interface 410. The sensors track the movement of the force feedback mouse 400 in planar space and provide suitable electronic signals to an electronic portion of electronic interface 410. The electronic interface 410 provides position information to the computer 210. In addition, the computer 210 and/or electronic interface 410 provide force feedback signals to actuators coupled to electronic interface 410, and the actuators generate forces on members of the mechanical portion of the electronic interface 410 to provide forces on force feedback mouse 400 in provided or desired degrees of freedom. The user experiences the forces generated on the force feedback mouse 400 as realistic simulations of force sensations such as jolts, springs, textures, "barrier" forces, and the like.

The electronic portion of electronic interface 410 may couple the mechanical portion of the interface to the computer 210. The electronic portion may be included within the housing 415 of the electronic interface 410 or, alternatively, the electronic portion may be included in the computer 210 or as a separate unit with its own housing. Electronic interface 410 may include a local microprocessor distinct and separate from a microprocessor in the computer 210. The local microprocessor may be used to control force feedback on force feedback mouse 400 independently of the host computer, as well as sensor and actuator interfaces that convert electrical signals to appropriate forms usable by the mechanical portion of electronic interface 410 and the computer 210. For example, a rigid surface may be generated on computer screen 220 and a cursor 115 controlled by the user may be caused to interact with, for example by intersecting, the surface. In this embodiment, high-level host commands can be used to provide the various forces associated with the rigid surface. The local control mode using a local microprocessor in electronic interface 410 can be helpful in increasing the response time for forces applied to the user object, which is essential in creating realistic and accurate force feedback. For example, the computer 210 may send a "spatial representation" to the local microprocessor, which is data describing the locations of some or all the graphical objects displayed in a graphical environment 110 which are associated with forces and the types/characteristics of graphical objects, such as a graphical representation 120, in the graphical environment 110. The microprocessor can store such a spatial representation in local memory, and thus will be able to determine interactions between the user object and graphical objects (such as the rigid surface) independently of the computer 210. In addition, the microprocessor can be provided with the necessary instructions or data to check sensor readings, determine cursor and target positions, and determine output forces independently of the computer 210. The computer 210 could implement program functions (such as displaying images) when appropriate, and synchronization commands can be communicated between the microprocessor and computer 210 to correlate the microprocessor and computer processes. Also, the local memory can store predetermined force sensations for the microprocessor that are to be associated with particular types of or portions of the graphical representation 120. Alternatively, the computer 210 can directly send force feedback signals to the electronic interface 410 to generate forces on force feedback mouse 400.

The electronic interface 410 can be coupled to the computer 210 by a bus 235, which communicates signals between electronic interface 410 and computer 210 and also may provide power to the electronic interface 410 (e.g. when bus 235 includes a USB interface). In other embodiments, signals can be sent between electronic interface 410 and computer 210 by wireless transmission/reception. In an embodiment of the present invention, the electronic interface 410 serves as an input/output (I/O) device for the computer 210. The electronic interface 410 can also receive inputs from other input devices or controls that are associated with the haptic interface 140 and can relay those inputs to the computer 210. For example, commands sent by the user activating a button on force feedback mouse 400 can be relayed to computer 210 by electronic interface 410 to implement a command or cause the computer 210 to output a command to the electronic interface 410.

There are two primary "control paradigms" of operation for the force feedback mouse 400: position control and rate control. Position control is the more typical control paradigm for mouse and similar controllers, and refers to a mapping of force feedback mouse 400 in which displacement of the force feedback mouse 400 in physical space directly dictates displacement of the cursor 115. The mapping can have an arbitrary scale factor or even be nonlinear, but the fundamental relation between mouse displacements and graphical object displacements should be present. Under a position control mapping, the cursor 115 does not move unless the force feedback mouse 400 is in motion. Position control is commonly used for medical procedure simulations. Position control force feedback roughly corresponds to forces which would be perceived directly by the user, i.e., they are "user-centric" forces. Also, "ballistics" or other non-linear adjustments to cursor position can be used, in which, for example, small motions of the mouse have a different scaling factor for cursor movement than large motions of the mouse, to allow more control of small cursor movement. As shown in FIG. 10, the computer 210 may have its own "host frame" which is displayed on the display screen 220 and represented by the coordinates u,v. In contrast, the force feedback mouse 400 has its own "local frame" in which the force feedback mouse 400 is moved and represented by coordinates x,y. In a position control paradigm, the position (or change in position) of a user-controlled graphical object, such as a cursor, in host frame corresponds to a position (or change in position) of the force feedback mouse 400 in the local frame. The offset between the object in the host frame and the object in the local frame can be changed by the user. Rate control may also or alternatively be used as a control paradigm. This refers to a mapping in which the displacement of the force feedback mouse 400 along one or more provided degrees of freedom is abstractly mapped to motion of a computer-simulated object under control. There is not a direct physical mapping between physical object (mouse) motion and computer object motion. Thus, most rate control paradigms are fundamentally different from position control in that the user object can be held steady at a given position but the controlled computer object is in motion at a commanded or given velocity, while the position control paradigm only allows the controlled computer object to be in motion if the user object is in motion.

Force feedback mouse 400 may be supported upon a grounded pad 420 which helps define the planar workspace 205. Pad 420 or a similar surface is supported by grounded surface 425. Force feedback mouse 400 contacts grounded pad 420 (or alternatively grounded surface 425) to provide additional support for the mouse and relieve stress on any mechanical support structures.

The haptic interface comprising a force feedback mouse may also include an indexing function or "indexing mode" which allows the user to redefine the offset between the positions of the force feedback mouse 400 in the local frame and a cursor 115, in the host frame displayed by the computer 210. Indexing is inherently provided with a traditional position control device such as a standard mouse. When a physical limit to the mouse's movement is reached, the user typically lifts the mouse from the contacted surface and places the mouse in a different position to allow more room to move the mouse. While the mouse is off the contacted surface, no input is provided to control the cursor. Force feedback mouse 400 of the present invention also has a limit to movement in the provided planar workspace provided by a guide opening, as detailed below. To allow movement of the cursor in the host frame past the limits of the mouse local frame, "indexing" is implemented. In one implementation, the user may reposition the force feedback mouse 400 without moving the controlled graphical object or providing any other input to the host computer, thus allowing the user to redefine the offset between the object's position and the cursor's position. This is analogous to standard mouse indexing. In the present invention, such indexing is achieved through an input device such as button 405, or alternatively using switches, pressure sensors, optical sensors, contact sensors, voice recognition hardware, or other input devices. As long as the indexing button or device is activated, the force feedback mouse 400 is in indexing mode and can be moved without providing any input to the host computer (e.g., without moving the controlled graphical object). When the button is released (or indexing mode otherwise exited), the position of the cursor is again controlled by the position of the force feedback mouse 400. Alternatively, the user might toggle indexing mode and non-indexing mode with one press of a button 405 or other input device. Indexing mode can be performed directly by the computer 210, or a local microprocessor can perform the indexing function. For example, the local processor can determine when indexing mode is active, and simply not report the position of the force feedback mouse 400 to the the computer 210 while such mode is active. A hand weight switch may also be provided for indexing purposes, as described in U.S. Pat. Nos. 5,825,308 and 6,100,874, both of which are incorporated herein by reference in their entireties.

FIG. 11a is a perspective view of an embodiment of the haptic interface 140 with the cover portion of housing 415 and the grounded pad 420 removed. Force feedback mouse 400 is coupled to a mechanical interface 430, which includes a mechanical linkage 435 that is coupled to a transducer assembly 440. A base 445 is provided to support the mechanical linkage 435 and transducer assembly 440 on grounded surface 425. In the described embodiment, the linkage 435 allows force feedback mouse 400 two planar degrees of freedom in the directions of arrows 230, and the members of the linkage 435 move approximately within a plane. The linkage is preferably coupled to grounded base 445 at an axis of rotation, described below. The transducer assembly 440 is coupled to base 445 and is thus also grounded.

In the described embodiment, at least part of the electronic interface 410 is positioned above the transducer assembly 440. For example, a printed circuit board 450 or similar support can be positioned over the top surface of transducer assembly 440. A number of integrated circuits and other components 455 can be coupled to the printed circuit board 450. This configuration allows the transducer assembly 440 and the electronic interface 410 to conform to a small volume which reduces the overall size of housing 415 and allows the mouse interface device to be positioned in convenient areas of a desktop or other area accessible to a user.

FIG. 11b is a perspective view of a portion of the mouse device 11 of FIG. 2a showing the mechanical interface 430 for providing mechanical input and output in accordance with the present invention. Mechanical linkage 435 provides support for force feedback mouse 400 and couples the mouse to a grounded surface 425, such as a tabletop or other support. Linkage 435 is, in the described embodiment, a 5-member (or "5-bar") linkage including a base 445, a first base member 460 coupled to base 445, a second base member 465 coupled to base 445, a first link member 470 coupled to first base member 460, and a second link member 475 coupled to first link member 470 and second base member 465. In the described embodiment, the first base member 460 and the first link member 470 are arranged generally symmetric to the second base member 465 and the second link member 475 across an axis extending perpendicularly through axes A and D. The symmetrical orientation of the members allows first base member 460 and first link member 470, in some embodiments, to be manufactured substantially in identical fashion as second base member 465 and second link member 475, thus saving on manufacturing costs. Force feedback mouse 400 is coupled to the linkage at the coupling between link members 470, 475. Fewer or greater numbers of members in the linkage can be provided in alternate embodiments. Base 445 of the linkage 435 is a base for the support of the linkage and is coupled to or resting on a ground surface 425. The base 445 in FIG. 11b is shown as a plate or base that extends under force feedback mouse 400.

The members of linkage 435 are rotatably coupled to one another through the use of rotatable pivots or bearing assemblies having one or more bearings, all referred to as "bearings" herein. Linkage 435 is rotatably coupled to base 445 by a grounded bearing 480 and can rotate about an axis A. First link member 470 is rotatably coupled to first base member 460 by bearing 485 and can rotate about a floating axis B, and first base member 465 is rotatably coupled to base 445 by bearing 480 and can rotate about axis A. Second link member 475 is rotatably coupled to second base member 465 by bearing 490 and can rotate about floating axis C, and second link member 475 is also rotatably coupled to first link member 470 by bearing 495 such that second link member 475 and first link member 470 may rotate relative to each other about floating axis D. In an alternate embodiment, a parallel linkage may be used as disclosed in U.S. Pat. 6,100,874, which is incorporated herein by reference in its entirety. The axes B, C, and D are "floating" in the sense that they are not fixed in one position relative to ground surface 425 as is axis A. Since the only connection of the four linkage members to the base 445 is through grounded bearing 480, only base members 460, 465 are grounded at axis A. Bearings 485, 490, and 495 are floating and not connected to the ground member. Preferably, the axes B, C, and D are all substantially parallel to each other.

Linkage 435 is formed as a five-member closed-loop chain. Each member in the chain is rotatably coupled to two other members of the chain. The five-member linkage is arranged such that the members can rotate about their respective axes to provide force feedback mouse 400 with two degrees of freedom, i.e., force feedback mouse 400 can be moved within a planar workspace defined by the x-y plane, which is defined by the x- and y-axes as shown in FIG. 11b. Linkage 435 is thus a "planar" five-member linkage, since it allows the force feedback mouse 400 to be moved within a plane. In addition, in the described embodiment, the members of linkage 435 are themselves approximately oriented in a plane.

Force feedback mouse 400 in this embodiment is coupled to link members 470, 475 by rotary bearing 495, for example at attachment plate 500. The mouse may also preferably rotate about floating axis D and allow the user some flexible movement in the planar workspace. The allowed rotation can provided to allow the user's hand/wrist to conveniently stay in one position during mouse movement while the force feedback mouse 400 rotates about axis D. In alternate embodiments, mouse rotation about axis D may be sensed by sensors. In yet other embodiments, forces can be provided on force feedback mouse 400 about axis D using actuators. In the preferred embodiment, a pad or other support is provided under force feedback mouse 400 to help support the force feedback mouse 400, and is described in greater detail with respect to FIG. 11c.

Transducer assembly 440 is used to sense the position of force feedback mouse 400 in its workspace and to generate forces on the force feedback mouse 400. Transducer assembly 440 may include one or more sensors 505a, 505b and/or one or more actuators 510a, 510b. The sensors 505a, 505b collectively sense the movement of the force feedback mouse 400 in the provided degrees of freedom and send appropriate signals to the electronic interface 410. Sensor 505a senses movement of second base member 465 about axis A, and sensor 505b senses movement of first base member 460 about axis A. These sensed positions about axis A allow the determination of the position of force feedback mouse 400 using known constants such as the lengths of the members of linkage 435 and using well-known coordinate transformations. Member lengths particular to the interface device can be stored in a memory, such as EEPROM, to account for manufacturing variations among different interface devices; alternatively, variations of the particular link lengths from standard lengths can be stored in memory.

Sensors 505a, 505b are, in the described embodiment, grounded optical encoders that sense the intermittent blockage of an emitted beam. A grounded emitter/detector portion 515 includes an emitter that emits a beam which is detected by a grounded detector. A moving encoder disk portion or "arc" is provided at the end of members 460, 468 which each block the beam for the respective sensor in predetermined spatial increments and allows a processor to determine the position of the arc and thus the members 460, 465 by counting the spatial increments. Also, a velocity of members 460, 465 based on the speed of passing encoder marks can also be determined. In one embodiment, dedicated electronics such as a "haptic accelerator" may determine velocity and/or acceleration, as disclosed in U.S. Pat. No. 5,999,168 which is incorporated herein by reference in its entirety, and hereby incorporated by reference herein.

In the version shown, transducer assembly 440 also includes actuators 510a, 510b to transmit forces to force feedback mouse 400 in space, i.e., in two (or more) degrees of freedom of the user object. The bottom housing plate 520 of actuator 510a is rigidly coupled to base 445 (or grounded surface 425) and a moving portion of actuator 510a (for example a coil) is integrated into the base 445. The actuator 510a transmits rotational forces to first base member 460 about axis A. The housing 520 of the grounded portion of actuator 510b is rigidly coupled to base 445 or ground surface 425 through the grounded housing of actuator 510b, and a moving portion (for example a coil) of actuator 510b is integrated into second base member 465. Actuator 510b transmits rotational forces to second base member 465 about axis A. The combination of these rotational forces about axis A allows forces to be transmitted to force feedback mouse 400 in all directions in the planar workspace provided by linkage 435 through the rotational interaction of the members of linkage 435.

The operation of exemplary sensors 505a, 505b and actuators 510a, 510b are described in greater detail in U.S. Pat. Nos. 5,166,723 and 5,100,874, both of which are incorporated herein by reference in their entireties. Additional and/or different mechanisms can also be employed to provide desired degrees of freedom to force feedback mouse 400. This rotational degree of freedom can also be sensed and/or actuated, if desired, to provide an additional control degree of freedom. In other embodiments, a floating gimbal mechanism can be included between force feedback mouse 400 and linkage 435 to provide additional degrees of freedom to force feedback mouse 400. Optionally, additional transducers can be also added to electronic interface 410 in provided or additional degrees of freedom of force feedback mouse 400. In an alternate embodiment, the mechanism can be used for a 3-D interface device that allows a user to move a user object in three dimensions rather than the 2-D planar workspace disclosed. For example, in one embodiment, the entire mechanism can be made to rotate about a grounded axis, such as axis H extending through the actuators 510. For example, members (not shown) rigidly coupled to the actuators 510 or to base 445 can extend in both directions along axis H and be rotary coupled to a grounded surface at points H1 and H2. This provides a third (rotary) degree of freedom about axis H. A motor can be grounded to the surface near point H1 or H2 and can drive the mechanism about axis H, and a sensor, such as a rotary encoder, can sense motion in this third degree of freedom. One reason for providing axis H through the magnet assemblies is to reduce the inertia and weight contributed to motion about axis H by the magnet assemblies. Axis H can be provided in other positions in other embodiments. In such an embodiment, the user object 130 can be a stylus, grip, or other user object. A third linear degree of freedom to mechanism can be provided in alternate embodiments. One embodiment of a planar linkage providing three degrees of freedom is disclosed in co-pending patent application Ser. No. 08/736,161 filed Oct. 25, 1996 and hereby incorporated by reference herein.

FIG. 11c is a perspective view of the grounded pad 420 and electronic interface 410 of the mouse system, where the force feedback mouse 400 has been detached from the mechanical linkage 435. As shown, pad 420 preferably has a height h and may be hollow to allow the mechanical linkage 435 to be positioned underneath the top surface of the pad 420. The bearing 495 may be arranged to extend through a guide opening 525 in the pad 420. An attachment plate 500 can be coupled to the bearing 495 or rotatably coupled to a member of linkage 435 to provide a point for attaching the force feedback mouse 400 to the linkage 435. in one version, the force feedback mouse 400 is releasably coupled to attachment plate 500. In the described embodiment, the opening 525 provides the limits to the workspace of the force feedback mouse 400. Bearing 495 and plate 500 protrude through opening 525 such that a rounded portion of plate 500 (provided under the flat plate portion), when moved in any degree of freedom of the force feedback mouse 400, eventually impacts a side of opening 525. The four sides to the opening 525 thus provide limits to the workspace of the force feedback mouse 400 in the provided planar degrees of freedom, i.e., a stop mechanism is provided that limits the movement of the force feedback mouse 400 as defined by the size of opening 525. Opening 525 can be made any size desired. For example, in the described embodiment, opening 525 has relatively small dimensions, such as approximately 1⅜" by 1⅛". The size of the opening 525 is larger than the workspace of the mouse due to the size or radius of the rounded portion; thus, with the described opening size, a workspace of about 1" by ¾" is obtained for the force feedback mouse 400 (which is considered at the center of bearing 495 at axis D). This is typically adequate workspace for the user to move the mouse and control a graphical object such as a cursor 115 on a display screen. In addition, this size workspace has an aspect ratio of 4:3, which is about the aspect ratio of a standard computer monitor, television, or other display screen. An aperture 530 can also be provided to route wires or cables from buttons, for example, on the mouse to the electronic interface 410. Alternatively, an inductive coil can be included in force feedback mouse 400 to transmit a signal when a button is activated, where the signal is received by another inductive coil in pad 420 which detects the activation of buttons, the operation of such coils being well known to those skilled in the art. Other wireless devices can also be used.

The top surface of grounded pad 420 may be a smooth material, such as a smooth slick plastic, to allow contact with portions of force feedback mouse 400. Such contact provides support for force feedback mouse 400 when the mouse is moved in its planar workspace and allows the mouse to slide on the pad 420 with little friction. Since the linkage 435, when extended, is cantilevered at a large moment arm, a small force at the mouse end of the linkage can create a large torque that stresses the mounting or coupling 480 at axis A, which may use the mounting or coupling to bend. Pad 420 thus balances the cantilever load by providing support to any pressure or force from the user in the z-direction on force feedback mouse 400 toward the ground surface 425.

FIG. 12 is a block diagram illustrating a version of the haptic interface 140 comprising an electronic interface 410 and a mechanical interface 430 usable with the version of the invention shown in FIGS. 10, and 11a–11c. The simulation system 100 includes a computer 210 and the haptic interface 140. The computer 210 may include a host microprocessor 540, random access memory (RAM) 545, read-only memory (ROM) 550, input/output (I/O) electronics 555, a clock 560, a display device 220, and an audio output device 565. Host microprocessor 540 can include a variety of available microprocessors from Intel, AMD, Motorola, or other manufacturers. Host microprocessor 540 can be single microprocessor chip, or can include multiple primary and/or co-processors. Host microprocessor 540 preferably retrieves and stores instructions and other necessary data from RAM 545 and ROM 550 as is well known to those skilled in the art. In the described embodiment, the computer 210 can receive sensor data or a sensor signal via a bus 235. Host microprocessor 540 can receive data from bus 235 using I/O electronics 555, and can use I/O electronics to control other peripheral devices. The computer 210 can also output commands to haptic interface device 140 via bus 235 to cause force feedback for the simulation system 100.

Clock 560 is a standard clock crystal or equivalent component used by the computer 210 to provide timing to electrical signals used by host microprocessor 540 and other components of the computer 210. Clock 560 is accessed by the computer 210 in the control process of the present invention to provide timing information that may be necessary in determining force or position, e.g., calculating a velocity or acceleration from position values.

Display device 220 is similar to that described above. Audio output device 565, such as speakers, can be coupled to host microprocessor 540 via amplifiers, filters, and other circuitry well known to those skilled in the art. Host processor 540 outputs signals to speakers 565 to provide sound output to the user when an "audio event" occurs during the implementation of the host application program. Other types of peripherals can also be coupled to host processor 540, such as storage devices (hard disk drive, CD ROM drive, floppy disk drive, etc.), printers, and other input and output devices.

Haptic interface 140 includes an electronic interface 410 and a mechanical interface 430 (which each may include both electronic and mechanical components). The electronic interface 410 is coupled to the computer 210 by a bi-directional bus 235. The bi-directional bus 235 sends signals in either direction between the computer 210 and the interface device 140. Bus 235 can be a serial interface bus, as discussed above. A USB may serve as the serial interface bus to also source power to drive actuators 510 and other devices. Since each device that accesses the USB is assigned a unique USB address by the computer 210, this allows multiple devices to share the same bus. In addition, the USB standard includes timing data that is encoded along with differential data.

The Electronic interface 410 includes a local microprocessor 570, local clock 575, local memory 580, sensor interface 585, and actuator interface 590. Electronic interface 410 may also include additional electronic components for communicating via standard protocols on bus 235. In various embodiments, electronic interface 410 can be included in mechanical interface 430, in the computer 210, or in its own separate housing. Different components of electronic interface 410 can be included in interface 430 or the computer 210 if desired.

Local microprocessor 570 may be coupled to bus 235 and may be closely linked to mechanical interface 430 to allow quick communication with other components of the interface device. Processor 570 is considered "local" to haptic interface 140, where "local" herein refers to processor 570 being a separate processor, such as a microprocessor, from a processor 540 in the computer 210. "Local" may also refer to processor 570 being dedicated to force feedback and sensor I/O of the haptic interface 140, and being closely coupled to sensors and actuators of the mechanical interface 430, such as within the housing of or in a housing coupled closely to interface 430. Microprocessor 570 can be provided with software instructions to wait for commands or requests from the computer 210, parse/decode the command or request, and handle/control input and output signals according to the command or request. In addition, processor 570 may operate independently of the computer 210 by reading sensor signals and calculating appropriate forces from those sensor signals, time signals, and force processes selected in accordance with a host command, and output appropriate control signals to the actuators. Suitable microprocessors for use as local microprocessor 570 include the MC68HC711E9 by Motorola and the PIC16C74 by Microchip, for example. Microprocessor 570 can include one microprocessor chip, or multiple processors and/or co-processor chips. In other embodiments, microprocessor 570 can include digital signal processor (DSP) functionality.

For example, in one host-controlled embodiment that utilizes a local microprocessor 570, the computer 210 can provide low-level force commands over bus 235, which microprocessor 570 directly transmits to the actuators 510. In a different local control embodiment, the computer 210 provides high level supervisory commands to microprocessor 570 over bus 235, and microprocessor 570 manages low level force control loops to sensors and actuators in accordance with the high level commands and independently of the computer 210. In the local control embodiment, the microprocessor 570 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or kinesthetic forces simulating interactions between displayed objects in the graphical environment 110. An "enclosure" host command can also be provided, which causes the microprocessor 570 to define a box-like enclosure in a graphical environment 110, where the enclosure has sides characterized by wall and texture forces, as described in U.S. Pat. No. 6,100,874. The computer 210 can send the local processor 570 a spatial layout of objects, such as a graphical representation 120 in the graphical environment 110 so that the microprocessor 570 has a mapping of locations of graphical objects like enclosures and can determine interactions with the cursor 115 locally. Force feedback used in graphical environments is described in greater detail in U.S. Pat. Nos. 5,629,594 and 5,825,308, both of which are incorporated by reference herein.

Sensor signals used by microprocessor 570 are also reported to the computer 210, which updates a host application program and outputs force control signals as appropriate. For example, if the user moves force feedback mouse 400, the computer 210 receives position and/or other signals indicating this movement or manipulation of the user object 130 and can move a displayed cursor 115 in response. In an alternate embodiment, no local microprocessor is included in the haptic interface 140, and the computer 210 directly controls and processes all signals to and from the electronic interface 410 and mechanical interface 430.

A local clock 575 can be coupled to the microprocessor 570 to provide timing data, similar to system clock 560 of the computer 210; the timing data might be required, for example, to compute forces output by actuators 510 (e.g., forces dependent on calculated velocities or other time dependent factors). In alternate embodiments using the USB communication interface, timing data for microprocessor 570 can be retrieved from the USB interface. Local memory 580, such as RAM and/or ROM, may be coupled to microprocessor 570 in to store instructions for microprocessor 570 and store temporary and other data. Microprocessor 570 may also store calibration parameters in a local memory 580 such as an EEPROM. As described above, link or member lengths or manufacturing variations and/or variations in coil winding or magnet strength can be stored. If analog sensors are used, adjustments to compensate for sensor variations can be included, e.g. implemented as a look up table for sensor variation over the user object workspace. Memory 580 may be used to store the state of the force feedback device, including a reference position, current control mode or configuration, etc.

Sensor interface 585 may optionally be included in electronic interface 410 to convert sensor signals to signals that can be interpreted by the microprocessor 570 and/or the computer 210. For example, sensor interface 585 can receive signals from a digital sensor such as an encoder and convert the signals into a digital binary number representing the position of a member or component of mechanical apparatus 430. An analog to digital converter (ADC) in sensor interface 585 can convert a received analog signal to a digital signal for microprocessor 570 and/or the computer 210. Such circuits, or equivalent circuits, are well known to those skilled in the art. Alternately, microprocessor 570 can perform these interface functions without the need for a separate sensor interface 585. Alternatively, sensor signals from the sensors 505 can be provided directly to the computer 210, bypassing microprocessor 570 and sensor interface 585. Other types of interface circuitry can also be used.

Actuator interface 590 can be optionally connected between the actuators 510 and microprocessor 570. Actuator interface 590 converts signals from microprocessor 570 into signals appropriate to drive the actuators. Actuator interface 590 can include power amplifiers, switches, digital to analog controllers (DACs), and other components. Such interfaces are well known to those skilled in the art. In alternate embodiments, actuator interface 570 circuitry can be provided within microprocessor 570 or in the actuators 510.

In the described embodiment, power is supplied to the actuators 510 and any other components (as required) by the USB. Since the electromagnetic actuators of the described embodiment have a limited physical range and need only output, for example, about 3 ounces of force to create realistic force sensations on the user, very little power is needed. A large power supply thus need not be included in interface system or as an external power adapter. For example, one way to draw additional power from the USB is to the haptic interface 140 to appear as more than one peripheral to the computer 210; for example, each provided degree of freedom of force feedback mouse 400 can be configured as a different peripheral and receive its own allocation of power. Alternatively, power from the USB can be stored and regulated and thus used when needed to drive actuators 510. For example, power can be stored over time and then immediately dissipated to provide a jolt force to the user object 130. A battery or a capacitor circuit, for example, can store energy and discharge or dissipate the energy when power is required by the system and/or when enough power has been stored. Alternatively, a power supply 595 can optionally be coupled to actuator interface 590 and/or actuators 510 to provide electrical power. Power supply 595 can be included within the housing of the haptic interface device 140, or can be provided as a separate component, for example, connected by an electrical power cord. The power storage embodiment described above, using a battery or capacitor circuit, can also be used in non-USB embodiments to allow a smaller power supply 595 to be used.

Mechanical interface 430 is coupled to the electronic interface 410 and may include sensors 505, actuators 510, and linkage 435. These components are described in detail above. Sensors 505 sense the position, motion, and/or other characteristics of force feedback mouse 400 along one or more degrees of freedom and provide signals to microprocessor 570 including information representative of those characteristics. Typically, a sensor 505 is provided for each degree of freedom along which force feedback mouse 400 can be moved, or, a single compound sensor can be used for multiple degrees of freedom. Example of sensors suitable for embodiments described herein are optical encoders, as described above. Linear optical encoders may similarly sense the change in position of force feedback mouse 400 along a linear degree of freedom. Alternatively, analog sensors such as potentiometers can be used. It is also possible to use non-contact sensors at different positions relative to mechanical interface 430, such as Hall effect magnetic sensors for detecting magnetic fields from objects, or an optical sensor such as a lateral effect photo diode having an emitter/detector pair. In addition, velocity sensors (e.g., tachometers) for measuring velocity of force feedback mouse 400 and/or acceleration sensors (e.g., accelerometers) for measuring acceleration of force feedback mouse 400 can be used. Furthermore, either relative or absolute sensors can be employed.

Actuators 510 transmit forces to force feedback mouse 400 in one or more directions along one or more degrees of freedom in response to signals output by microprocessor 570 and/or the computer 210, i.e., they are "computer controlled." Typically, an actuator 510 is provided for each degree of freedom along which forces are desired to be transmitted. Actuators 510 can include active actuators, such as linear current control motors, stepper motors, pneumatic/hydraulic active actuators, a torquer (motor with limited angular range), a voice coil actuator as described in the embodiments above, and/or other types of actuators that transmit a force to an object. Passive actuators can include magnetic particle brakes, friction brakes, or pneumatic/hydraulic passive actuators, and generate a damping resistance or friction in a degree of motion. For example, an electrorheological fluid can be used in a passive damper, which is a fluid that has a viscosity that can be changed by an electric field. Likewise, a magnetorheological fluid can be used in a passive damper, which is a fluid that has a viscosity that can be changed by a magnetic field. These types of dampers can be used instead of or in addition to other types of actuators in the mouse interface device. In yet other embodiments, passive damper elements can be provided on the bearings of interface 430 to remove energy from the system and intentionally increase the dynamic stability of the mechanical system. In addition, in voice coil embodiments, multiple wire coils can be provided, where some of the coils can be used to provide back EMF and damping forces. In some embodiments, all or some of sensors 505 and actuators 510 can be included together as a sensor/actuator pair transducer.

The mechanism 435 may be the five-member linkage 435 described above, but can also be one of several types of mechanisms. Force feedback mouse 400 can alternatively be a puck, joystick, or other device or article coupled to linkage 435, as described above.

Other input devices 600 can optionally be included in system 100 and send input signals to microprocessor 570 and/or the computer 210. Such input devices can include buttons, such as buttons 405 on force feedback mouse 400, used to supplement the input from the user to a simulation, GUI, game, etc. Also, dials, switches, voice recognition hardware (with software implemented by computer 210), or other input mechanisms can be used.

Safety or "deadman" switch 605 may be included in haptic interface device 140 to provide a mechanism to allow a user to override and deactivate actuators 510, or require a user to activate actuators 510, for safety reasons, as discussed above.

Haptic sensations may be designed to be output by the force feedback mouse 400 in association with, for example, a palpation simulation being performed with the simulation system 100. For example, all of the tactile sensations discussed above in connection with the tactile mouse 250 can be output by the force feedback mouse 400. For example, a desired vibration may be output to simulate a pulse or other vibration to be simulated.

In addition, the force feedback mouse 400 may output grounded lateral forces to provide kinesthetic force simulation of the interaction of the cursor 115 with the graphical representation 120. For example, a barrier force may be associated with the boundary of the graphical representation 120. When the cursor 115 intersects the boundary of the graphical representation 120, a spring force, for example may be output to the force feedback mouse 400 inhibiting movement of the force feedback mouse 400 in the direction of the graphical image 120. A high value may be selected for the spring constant to simulate a hard object that can not be easily penetrated, and a lower value may be selected to simulate softer surfaces. Additionally or alternatively, a constant or a substantially constant force may be applied to the force feedback mouse 400 to simulate a variety of events, such as the friction of skidding the cursor 115 across the graphical representation 120.

The force feedback mouse 400 is also particularly advantageous in simulating the three dimensional surface contour of the graphical representation 120. A three dimensional mouse may output barrier forces in three dimensions to give a precise haptic simulation of the three dimensional contour of a graphical representation 120. Alternatively, and unexpectedly, a two-dimensional force feedback mouse 400, such as the version of FIG. 10, may output lateral forces to allow the user to feel the three dimensional contour of the graphical representation 120. This can be achieved, for example, using spring forces or constant forces to make the user perceive a z-axis contour. FIGS. 13A–D schematically illustrate the forces to be output in order to simulate the three dimensional contour. FIG. 13A shows the cross-section, for example in the x,z plane, of a graphical representation 120. This cross-section would typically not be displayed on the screen 220 but is shown in FIG. 13A to illustrate the force effects and force profile associated with the surface of the representation. A geometrical model similar to the one shown in FIG. 13A could be used to approximate a patient's wrist, for example. As a cursor 115 is moved from the position shown in FIG. 13A along the x-axis, it will intersect the graphical representation 130. FIG. 13B shows a force profile that may be output to the force feedback mouse 400 as a function of the position of the cursor 115 in relation to the graphical representation 120. Before the cursor 115 reaches the graphical representation 120, that is when the cursor 115 is positioned to the left of point a, there is no force output to the user. In the position between points a and b in the x axis, a constant force in the negative x direction is output to simulate the force required to climb the slope of the edge of the graphical representation 120. When the cursor 115 is positioned at an x-axis position corresponding to the top portion from points b to c, no force is output. Alternatively, a small negative force, such as a force equal to about ten percent of the force applied between points a and b, may be output to simulate friction along the surface or haptic sensations such as pops may be output to simulate the texture of the surface. As the cursor 115 reaches point c, a positive force, optionally of the same but opposite value as the previously applied force, is then output to simulate the cursor 115 falling down the slope from points c to d. After point d, the force is released. This simulation can be effective in making the user perceive that a bump or other contour was felt, especially when combined with a breaking of the mapping of the display of the cursor 115 in relation to the graphical representation 120, as shown by broken map cursor 115'. FIG. 13C shows a rounded depression that may also be simulated. Due to the rounded nature of the sides of the contour, the magnitude of the applied force is greatest at points e and g of the contour. FIG. 13D shows a force profile that may be used to simulate the contour of FIG. 13C.

This modeling can be extended to a graphical representation of an entire portion of a body of to an entire body to allow the user to haptically interact with the graphical representation during palpation training. In this way surface features, such as ribs, bones, breasts, scars, fatty deposits, a navel, etc. can be felt by the user. For example, a the contour of a breast may be simulated with a 2-dimensional device, as shown in FIGS. 14A and 14B. This is accomplished by superimposing the surface contour simulation of a smaller portion of the graphical representation 120 over the surface contour simulation of a larger portion of the graphical representation 120, as shown.

In addition, features beneath the surface of the graphical representation 120 may be felt. In a simple version, force related to the underlying feature may be output when the cursor 115 is in the correct location within the graphical representation 120. For example, the simulation system 100 may task the user to locate the liver. Once the cursor is located at a position for proper palpation of the liver, subsequent movement of the cursor 115 may be caused by the simulation system 100 to appear as though the surface is being depressed and contour related force may be output based on the position of the cursor 115 (or based on the position of the user object 130). In another version, a force sensor may be included in the mouse 400 (or in another user object 130), and the user must press against the mouse 400 in order to cause the cursor 115 to be depressed into the graphical representation 120 (which may be displayed as a broken mapped cursor 115'). In this version, the contour forces may be output based on position and force. Accordingly, a user who has merely properly located the cursor over the liver, but who is not pressing into the body, will not feel the liver. Similarly, the user who is pressing too hard into the body may not be able to feel the liver and may receive an indication from the simulation system 100 that the patient is being injured or is uncomfortable. This version is shown schematically in FIGS. 15A through 15D. FIG. 15A shows a graphical representation 120 having a surface on which rests a cursor 115. Under the surface is a feature, such as a trapezoidal geometric model of a liver, which may be shown on the display, shown in phantom on the display, or not shown. The user must exert a z-axis force on the mouse 400 in order to simulate pressing into the surface. In one version, the mapping of the cursor is broken and the cursor 115' penetrates the surface in the z-direction as a function of the z-axis force applied by the user. When an insufficient z-axis force, Fz, has been applied, the user will receive no force simulation of an underlying feature, as shown by the force profile shown in FIG. 15B, where Fz is less than a first threshold, FT1. When the z-axis force, Fz, is above the first threshold, FT1, a force profile according to FIG. 15C, for example, will be output to the user to simulate the feel of the underlying feature. Optionally, a second threshold, FT2, may also be provided and the force profile may be altered when the second threshold, FT2, is exceeded. In the version shown in FIG. 15D, the force profile is a muted version of the force profile for appropriate force values. Additionally, the other indications, such as visual or audible indications, may be provided to inform the user that too much force has been applied. The force sensor may be embodied as part of a safety switch or may be a separate force sensor, for example of the piezo electric or strain gage type, as described in U.S. Pat. No. 6,100,874 which is incorporated herein by reference in its entirety.

In another and more advanced version of the invention, a coordinate transformation may be approximated to simulate three dimensional contour using a two-dimensional input device, such as the force feedback mouse 400. For example, the user's z-axis may be transformed into the graphical environment 110. The intersection of the transformed z-axis with the graphical representation 120 may then be determined. A unit vector normal to the graphical representation 120 at the intersection may then be computed. This unit vector may then be transformed back to the user's coordinates, scaled and output to the user.

It will be appreciated that a great number of other types of haptic interface devices 140 and/or user objects 130 can be used with the method and apparatus of the present invention, some of which are discussed above. For example, handheld devices are very suitable for the actuator assemblies described herein. A hand-held remote control device used to select functions of a television, video cassette recorder, sound stereo, internet or network computer (e.g., Web-TV™), or a gamepad controller for video games or computer games, can be used with the haptic feedback components described herein. Handheld devices are not constrained to a planar workspace like a mouse but can still benefit from the directed inertial sensations and contact forces described herein which, for example, can be output about perpendicularly to the device's housing surfaces. Other interface devices may also make use of the actuator assemblies described herein. For example, a joystick handle can include the actuator assembly, where haptic sensations are output on the joystick handle as the sole haptic feedback or to supplement kinesthetic force feedback in the degrees of freedom of the joystick. Trackballs, steering wheels, styluses, rotary knobs, linear sliders, gun-shaped targeting devices, medical devices, grips, etc. can also make use of the actuator assemblies described herein to provide haptic sensations. The haptic interface may comprise a gamepad type device, a remote control device, a PDA, or a touchpad or tactile display. In one version, a haptic touchpad, such as the one described in co-pending patent application Ser. No. 09/487,737 filed on Jan. 19, 2000, which is incorporated herein by reference in its entirety. In this version, the touchpad may be incorporated into or used with a lap-top computer. Accordingly, the entire simulation system 100 may be housed within the lap-top computer.

In another version, as shown in FIG. 16, a mouse 200, or other user object 130 comprises a finger receiving member 610. In the version shown, a first finger receiving recess or channel 615 is positioned adjacent to a second finger receiving recess or channel 620. Using this version, a user may control the movement of the cursor 115 using only his or her fingers. This provides a particularly realistic simulation when the cursor 115 is representative of the user's fingers, as shown for example in the version of FIG. 3. This version is also advantageous in that the haptic sensations are applied directly to the fingers of the user in much the same manner as the user would experience the sensations in an actual procedure. Alternatively, one finger receiving recess or channel may be provided, or more than two, such as five, may be provided. The recess or channel may be a trough, as shown, or may be a recess in the housing of the mouse 200, or may be in the form of a cylindrical or conical cuff that encircles one or more fingers. The recesses or channels may be positioned on the mouse 200 in a manner to allow the buttons to be depressed. For example, the recess or channel may be flexible, may include an opening through which the finger may contact a button, or may terminate short of a button to allow a user to access the button. Alternatively, the mouse 200 may not include buttons.

An application program, such as a palpation simulation program may be stored in a computer readable format on a computer readable medium. For example a computer readable medium may comprising a computer readable program including program instructions to cause a palpation simulation to be executed on the computer. The computer readable medium may comprise one or more of as memory in the computer, a magnetic disk or tape, a compact disk, a digital video disk, or the like. In one version, the computer readable program may be downloaded to the computer from a remote source via a networked connection.

In one version of the invention, a networked connection may be provided, for example as described in U.S. patent application Ser. No. 09/153,781 filed on Sep. 16, 1998, which is incorporated herein by reference in its entirety. In this version, a user may download an application program, such as a palpation simulation program, or a file of haptic sensations from a remote location. Also, a user may interact with a simulation running at a remote location. In another version, the haptic interface may be used as a master device to control a remote slave device. The slave device may be representative of the user's hand or fingers for example, and the user may control the slave to, for example, perform a palpation procedure on a remote patient. In an advanced version, the slave device may be equipped with sensors to detect conditions of the slave device, such as pressures or forces. The sensed conditions may then be used to provide haptic sensations to the user via the master device, the haptic sensations being related to the sensed conditions of the slave device.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the haptic interface of the present invention and many different types actuators and user objects can be used. In addition, the haptic interface can be replaced by a non-haptic interface, for example, when the mapping of the cursor is broken. Furthermore, certain terminology, such as terms like x, y, z, left, right, up, down, etc., has been used for the purposes of descriptive clarity, and not to limit the present invention. Therefore, the appended claims should not be limited to the description of the preferred versions contained herein and should include all such alterations, permutations, and equivalents as fall within the true spirit and scope of the present invention.

What is claimed is:

1. A method, comprising:

updating data values associated with at least a portion of a virtual hand displayed in a graphical environment of a host computer based on manipulation of at least a portion of an object coupled to the host computer, the portion of the virtual hand directly contacting a virtual body part to produce a virtual palpation within the graphical environment;

outputting a first haptic feedback to the object when the virtual palpation within the graphical environment occurs; and outputting a second haptic feedback the second haptic feedback being a scaled version of the first haptic feedback.

2. The method of claim 1, wherein the second haptic feedback is associated with a position of the virtual hand in a second region of the graphical environment.

3. The method of claim 1, wherein the first haptic feedback simulates a-heartbeat-induced vascular pulse.

4. The method of claim 1, wherein the first haptic feedback is associated with a simulated feature that is at least one of on the surface of the region within the graphical environment and below the surface of the region within the graphical environment, and second haptic feedback is associated with a simulated feature that is at least one of on the surface of the region within the graphical environment and below the surface of the region within a second region of the graphical environment.

5. The method of claim 1, wherein the first haptic feedback includes a vibration.

6. The method of claim 1, wherein the first haptic feedback includes a spring force.

7. The method of claim 1, wherein the object includes a mouse.

8. The method of claim 7, wherein the mouse includes an actuator coupled to a housing and the outputting of the first and second haptic feedback includes outputting the first and second haptic feedback via the actuator.

9. The method of claim 8, wherein the first haptic feedback is configured to simulate a heartbeat-induced vascular pulse.

10. The method of claim 7, the mouse further comprising a grounded linkage.

11. The method of claim 10, wherein the outputting first haptic feedback includes outputting the first haptic feedback via the grounded linkage.

12. The method of claim 4, wherein the host computer includes an application program which comprises the steps of:

creating the graphical representation of the virtual body part;

moving the virtual hand relative to the virtual body part in response to input from a manipulatable object; and outputting a feedback based on interaction of the portion of the virtual hand with a region within the virtual body part.

13. The method of claim 12, wherein the feedback may be visual, audible or haptic feedback.

14. The method of claim 12, wherein the interaction of the portion of the virtual hand with a region within the virtual body part is a predetermined interaction.

15. The method of claim 12, wherein the feedback simulates a heartbeat-induced vascular pulse of the virtual body part.

16. The method of claim 15, wherein the simulation of the heartbeat-induced vascular pulse may have variable parameters.

17. The method of claim 12, wherein the virtual appendage has a shape different from the shape of the object.

18. The method of claim 1, wherein the virtual hand has a shape different from the shape of the object.

19. A method, comprising:
updating data values associated with at least a portion of a virtual hand displayed in a graphical environment of a host computer based on manipulation of at least a portion of an object coupled to the host computer;
outputting a first haptic feedback to the object based on a first signal associated with an interaction of the portion of the virtual hand with a graphical representation of a virtual being, the graphical representation of the virtual being having a first region and a second region different from the first region and the first haptic feedback being a simulated pulse of the virtual being; and
outputting a second haptic feedback based on a signal associated with an interaction of the portion of the virtual hand with the second region of the graphical representation.

20. The method of claim 19, wherein the second haptic feedback is a scaled version of the first haptic feedback.

21. The method of claim 19, wherein the first haptic feedback includes a vibration.

22. The method of claim 21, wherein the first haptic feedback includes a substantially sinusoidal waveform.

23. The method of claim 19, wherein the object includes a mouse having an actuator coupled to a housing, the outputting the first and second haptic feedback includes outputting the first and second haptic feedback via the actuator.

24. The method of claim 19, wherein the virtual hand has a shape different from the shape of the object.

25. A method, comprising:
updating data values associated with at least a portion of a virtual appendage displayed in a graphical environment of a host computer based on manipulation of at least a portion of an object coupled to the host computer, the portion of the virtual appendage directly contacting a virtual subject to produce a virtual palpation of the virtual subject within the graphical environment; and
outputting a first haptic feedback to the object based on interaction of the portion of the virtual appendage with a graphical representation of the virtual subject within the graphical environment, the first haptic feedback simulating a palpated feature that is one of on and below a surface of the graphical representation of the virtual subject; and
outputting a second haptic feedback to the object based on interaction of the portion of the virtual appendage with a graphical representation of the virtual subject within the graphical environment, the second haptic feedback simulating a palpated feature that is one of on and below a surface of the graphical representation of the virtual subject.

26. The method of claim 25, wherein the application program includes a palpation training program including an instruction to perform a simulated palpation procedure.

27. The method of claim 25, wherein the first haptic feedback includes a spring force.

28. The method of claim 25, wherein the object includes a mouse.

29. The method of claim 28, wherein the mouse includes a grounded linkage.

30. The method of claim 29, wherein the outputting first haptic feedback includes outputting the first haptic feedback via the grounded linkage.

31. The method of claim 28, the mouse including at least one of a force detector and pressure detector, the method further comprising detecting at least one of a force and a pressure.

32. The method of claim 31, wherein the outputting the first haptic feedback is associated with the detected at least one of the force and the pressure.

33. The method of claim 31, wherein the outputting the second haptic feedback is associated with the detected at least one of the force and the pressure.

34. The method of claim 25, wherein the simulated palpated feature is simulated as physically below the graphical representation.

35. The method of claim 25, wherein the first haptic feedback simulates a three dimensional contour of the graphical representation.

36. The method of claim 35, wherein the object is substantially constrained to movement in a geometric plane.

37. The method of claim 25, wherein the second haptic feedback simulates a three dimensional contour of the graphical representation.

38. The method of claim 37, wherein the object is substantially constrained to movement in a geometric plane.

39. A simulator, comprising:
a manipulatable object in communication with a processor, the processor associated with a graphical representation of at least a portion of a virtual subject;
a sensor coupled to the manipulatable object and in communication with the processor, the sensor configured to update data values associated with at least a portion of a virtual appendage in the graphical representation based on a manipulation of the manipulatable object;
an actuator coupled to the manipulatable object and configured to output haptic feedback based on interaction of the portion of the virtual appendage with a region within the graphical representation, the haptic feedback simulating a heartbeat-induced vascular pulse of the virtual subject; and the manipulatable object includes a housing of a mouse.

40. The simulator of claim 39, the actuator being coupled to the housing of the mouse, the actuator configured to output the haptic feedback.

41. The simulator of claim 39, wherein the object includes a mouse.

42. The simulator of claim 41, wherein the mouse includes a grounded linkage.

43. The simulator of claim 42, the actuator being configured to cause the grounded linkage to output the haptic feedback.

44. A program storage device readable by a machine, tangibly embodying a program of instructions executable by the machine to perform a method for updating data values associated with at least a portion of a virtual appendage displayed in a graphical environment of a host computer and outputting a first and second haptic feedback to an object coupled to the host computer, the method including:
- updating data values associated with at least a portion of a virtual appendage displayed in a graphical environment of a host computer based on manipulation of at least a portion of an object coupled to the host computer;
- producing a virtual palpation of the virtual subject within the graphical environment when the portion of the virtual appendage directly contacts a virtual subject part;
- outputting a first haptic feedback to the object based on interaction of the portion of the virtual appendage with a graphical representation of the virtual subject within the graphical environment, the first haptic feedback simulating a palpated feature that is one of on and below a surface of the graphical representation of the virtual subject; and
- outputting a second haptic feedback to the object based on interaction of the portion of the virtual appendage with a graphical representation of the virtual subject within the graphical environment, the second haptic feedback simulating a palpated feature that is one of on and below a surface of the graphical representation of the virtual subject.

* * * * *